(12) United States Patent
Brzezicki et al.

(10) Patent No.: US 8,566,132 B2
(45) Date of Patent: Oct. 22, 2013

(54) SYSTEM AND METHOD FOR AUDITING INSURANCE VENDORS

(71) Applicant: Hartford Fire Insurance Company, Hartford, CT (US)

(72) Inventors: Michael A. Brzezicki, Torrington, CT (US); Marlene G. Chickerella, Enfield, CT (US); Stacey L. Doucette, South Windsor, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 0 days.

(21) Appl. No.: 13/671,131

(22) Filed: Nov. 7, 2012

(65) Prior Publication Data

US 2013/0066658 A1     Mar. 14, 2013

Related U.S. Application Data

(63) Continuation of application No. 12/774,264, filed on May 5, 2010, now Pat. No. 8,332,243.

(51) Int. Cl.
*G06Q 40/00*     (2012.01)

(52) U.S. Cl.
USPC .......................................................... 705/4

(58) Field of Classification Search
USPC .......................................................... 705/4
See application file for complete search history.

(56) References Cited

U.S. PATENT DOCUMENTS

| | | | |
|---|---|---|---|
| 2001/0044735 A1* | 11/2001 | Colburn et al. | 705/4 |
| 2003/0018487 A1* | 1/2003 | Young et al. | 705/1 |
| 2003/0132298 A1* | 7/2003 | Swartz et al. | 235/472.02 |
| 2006/0288010 A1* | 12/2006 | Chen et al. | 707/9 |
| 2007/0095909 A1* | 5/2007 | Chaum | 235/386 |
| 2008/0255971 A1* | 10/2008 | McKinnon et al. | 705/31 |

\* cited by examiner

*Primary Examiner* — Lindsay M. Maguire
(74) *Attorney, Agent, or Firm* — McCormick, Paulding & Huber LLP

(57) ABSTRACT

A computerized system and computer-implemented method for enabling insurance vendor self-audits that receives referral data from a vendor, samples the referrals, assigns audit questions to each referral within the sample of referrals, presents the audit questions to the vendor and receives answers from the vendor, scores the answers based on rules, and reports the audit scores.

26 Claims, 24 Drawing Sheets

Case Management and Vocational Rehabilitation SLA Scores  Q4 2009 — 806

| | Task Referrals | | Hourly Referrals | | SLA Score | Equiv Points | Weight |
|---|---|---|---|---|---|---|---|
| | A | B | C | D | | | |
| Vendor: Corvel | | | | | | | |
| Timeliness Calculation | 1 | 8 | 0 | 7 | 98.72 | 19.74 | 20% |
| Billing Accuracy Calculation | 0 | 0 | 0 | 0 | #Div/0! | #Error | 15% |
| Jurisdiction Calculation | 0 | 3 | 0 | 7 | 100.00 | 5.00 | 5% |
| Credentialing Calculation | 1 | 3 | 0 | 7 | 90.00 | 4.50 | 5% |
| | | | # RTW | # closed | | | |
| Return to Work Calculation | | | 22 | 22 | 100.00 | (25.00) 806a | 25% |
| | MedTask | VocTask | MedHrly | VocHrly | | | |
| Medical Quality Calculation | 100 | 100 | 100 | 100 | 100.00 | 30.00 | 30% |
| | | | | | Vendor Overall Score: | #Error | 100% * |

*

Key:
- A = # of problematic Task Referral
- B = Total # of Task Referrals
- C = # of Problematic Hourly Referrals
- D = Total # of Hourly Referrals

- Am = MedTask Self-Audit Score
- Av = VocTask Self-Audit Score
- Bm = MedHrly Self-Audit Score
- Bv = VocHrly Self-Audit Score

FIG. 8
*(Cont'd)*

The Self Audit Score represents the cases which were selected as a representation of the whole, and reviewed with a narrow focus for Self Audit purposes. Service Level Credit Assessments will be applied against issues identified in the Self Audit in accordance with the Service Level Agreements. The Self Audit Score does not represent all issues that may have occurred in the Quarter. All other issues will be addressed separately as they arise, and their affects may not be capable of measurements for Self Audit purposes.

SYSTEM AND METHOD FOR AUDITING INSURANCE VENDORS

CROSS REFERENCE TO RELATED APPLICATION

This application is a continuation of prior application Ser. No. 12/774,264, filed on May 5, 2010, and published as U.S. Patent Application Publication No. 2011/0276352, the entire contents of which are incorporated herein by reference.

FIELD OF THE INVENTION

The present invention relates to insurance claims handling and, more particularly, to auditing third party service vendor referrals.

BACKGROUND OF THE INVENTION

Insurance is a business of providing specified benefits to insured parties in return for the payment of premiums. In the event of an accident or loss, a policyholder or a third-party claimant can obtain payments for insured services, as provided in an insurance policy, by filing an insurance claim with the issuing insurance company. Under many insurance policies, including for example workers' compensation and automotive collision policies, it is common for an authorized third party services vendor to provide services directly to the insured or claimant and receive payments on behalf of the insured party from the insurance company.

As the insurance business model relies upon an appropriate ratio of premiums to claims payments, it is important to ensure that only justifiable claims are paid. Accordingly, it is common for claims handling processes to include audits for validating that each billed service or referral, under each claim, has been provided by an authorized vendor according to relevant standards.

In fields of insurance such as worker's compensation, health care, or property and casualty loss, referrals audits require specific expertise relevant to the nature of each referral. Such expertise often is distinct from the actuarial and financial skills integral to insurers' businesses. Thus, particularly with reference to workers' compensation policies, most insurers prefer to rely upon the third party vendors to validate each referral submitted under a given claim. For this purpose, most insurers impose referral self-audit requirements on third party vendors as a condition of vendor acceptance. Additionally, most insurers have employees with relevant technical expertise, who periodically validate the results of vendor self-audits.

Self-audits can be burdensome in time and expense. Particular burdens include ensuring true random selection by the insurer of referrals to be audited, so that an entire population of referrals need not be audited by the vendor; and ensuring timely completion of the audit by the vendor. Whether the burden and expense initially are borne by the insurer or by the third party vendor, eventually the costs must be passed to consumers. Insurers, as any other service provider, wish to offer lower prices so as to attract more consumers. Thus, computerized methods and systems for expediting and automating vendor self-auditing have become highly desirable in the art of insured service referrals auditing.

SUMMARY OF THE INVENTION

According to the present invention, a computerized system automates and expedites vendor referrals information submissions, referrals review, and vendor referrals self-audits. The computerized system implements a method of uploading referrals information, sampling the uploaded referrals information, self-auditing the sample of referrals, and reporting the results of the self-audit.

In other embodiments of the present invention, the computerized system further implements methods of setting audit standards, monitoring trends in self-audit results, and training vendors to improve referral quality.

In some embodiments of the present invention, the computerized system includes a web-implemented user interface. The web-implemented interface may include a vendor instance, a supervisor instance, a user instance, and an administrator instance.

In some embodiments of the present invention, a module for vendor referrals submission may implement a method for uploading referrals via a vendor instance of a computer-implemented interface. The computer-implemented interface may be a web interface. The web interface may be provided via wired or wireless media. The computer-implemented interface may be implemented on a desktop computer, on a portable computer, on a handheld device, or by equivalent interactive means including TTY or automated voice response.

In some embodiments of the present invention, a module for sampling uploaded referrals may implement random sampling algorithms. Similarly, a self-auditing module may provide a random selection of audit topics and of specific audit questions, for minimizing time burdens on vendors. Alternatively or additionally, a self-auditing module may provide a targeted selection of audit topics and/or questions, based on data provided from an audit scoring module.

In some embodiments of the present invention, an audit reporting module may provide a report card via a vendor instance of a web interface. An audit reporting module may also include an audit trending process for determining how vendor performance varies over time and for identifying specific recurring deficiencies or problem areas.

In some embodiments of the present invention, a vendor training method may include modification and display of a referrals administration checklist, via a vendor instance of a computer-implemented interface, during a referrals uploading process. A referrals administration checklist may be produced according to a vendor audit report card. For example, a referrals administration checklist may be directly produced as the result of an audit trending process.

These and other objects, features and advantages of the present invention will become apparent in light of the detailed description of the best mode embodiment thereof, as illustrated in the accompanying drawings.

DESCRIPTION OF PREFERRED EMBODIMENTS

Figure 1:
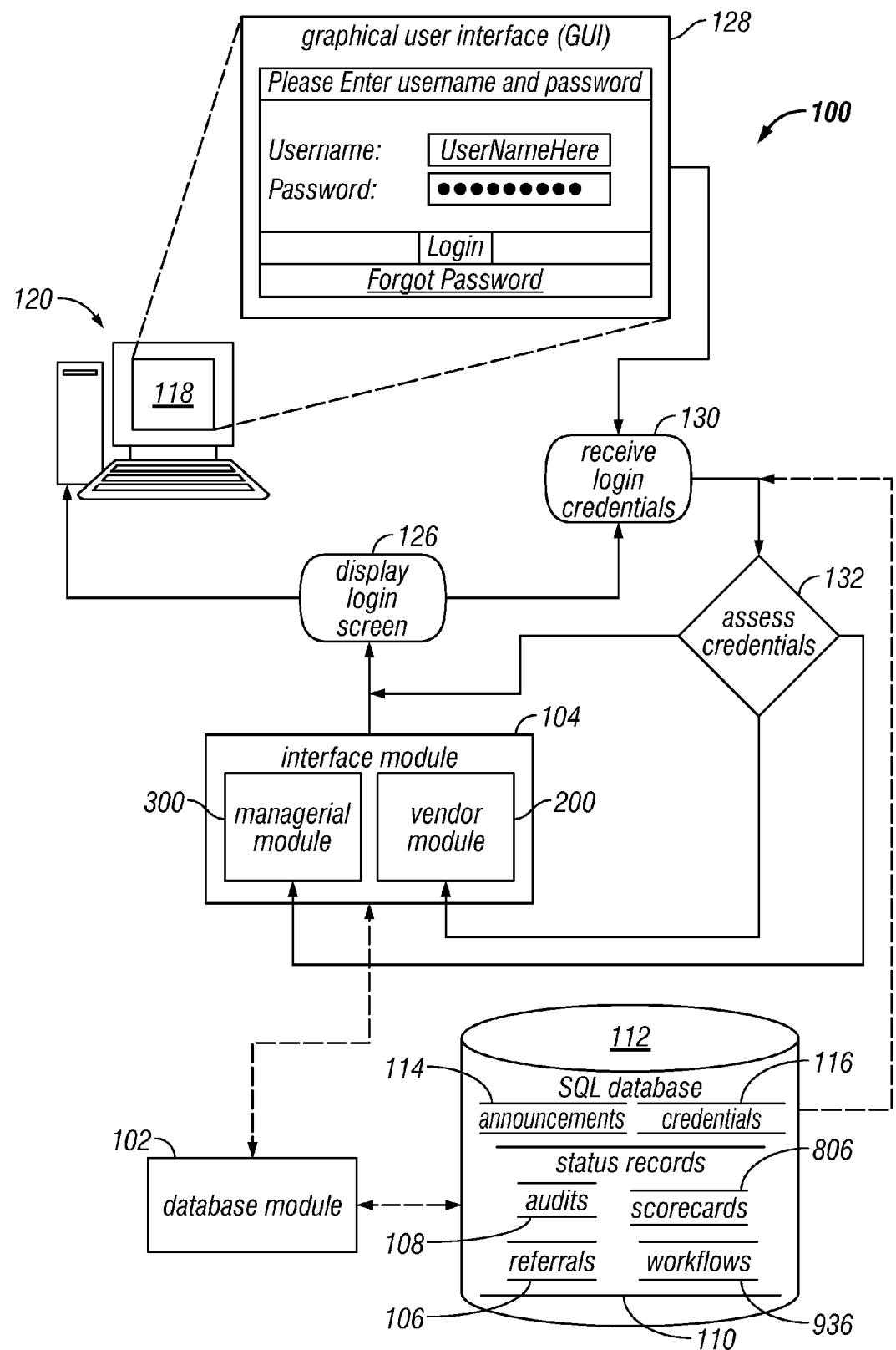
FIG. 1 shows a schematic view of a computerized system for implementing a computerized method for improved insurance claims handling, according to an embodiment of the present invention.

Referring to FIG. 1, the present invention relates to a computerized system 100, which assists vendors of insured services in accomplishing timely self-audits of vendor referrals. In use, a vendor, or another person acting on behalf of the vendor, may access the computerized system 100 via a secure web-implemented interface 118. As further discussed below with reference to FIGS. 2 and 4, referrals 106 can be uploaded to an insurer's database 112, via the web interface, on a monthly or quarterly basis. The computerized system 100 helps the vendor ensure that each uploaded referral 106 includes all required information. Referral 106 can include all the data required by an insurance company from the vendor related to the services provided to the insured or the claimant. Referral 106 will be associated with a particular claim file when stored in the system. While uploading the referrals 106, the vendor can view and modify each referral 106, as further discussed below with reference to FIG. 5. Preferably, any referral with missing information will be highlighted in yellow until the record is updated.

Once all of the uploaded referrals meet all business/technical requirements the vendor can then click on a Submit Data for Audit button (shown in FIG. 4), which will save the referrals to the database and will end an automated email to a Vendor Manager, notifying the vendor manager that the data is ready for review and a random audit sample can be run.

The vendor manager then can use the computerized system 100 to generate a random sample of referrals uploaded by the vendor, as further discussed below with reference to FIG. 6. The computerized system 100 will generate an automated email to the vendor when the random sample is ready for auditing.

The vendor can now begin their self-audit using the auditing module 700, as further discussed below with reference to FIG. 7. The referrals included in the random sample generated by the sampling module 600 can be viewed by clicking on one of four category links listed in the left navigation: Case Management>Hourly Referrals and Task Referrals or Vocational Rehabilitation>Hourly Referrals and Task Referrals. The vendor can answer the audit questions either partially or fully, and can save their responses by clicking a Save button. Audit questions that have not been fully answered will continue to appear under Case Management>Review Hourly Referrals and Review Task Referrals or Vocational Rehabilitation>Review Hourly Referrals and Review Task Referrals.

The vendor can submit the audit to the vendor manager by clicking a Submit to Vendor Manager button (shown in FIG. 7) when satisfied that all questions on an individual record have been fully answered. Clicking the Submit to Manager button generates a scorecard based on the vendor's answers to the audit questions, and further incorporating results of a billing audit separately conducted by the vendor manager, as further discussed below with reference to FIG. 8. The Scorecard is viewable by both the Vendor and the Vendor Manager. The Submit to Vendor Manager also sends an email notification to the Vendor Manager, requesting a schedule for formal Scorecard review.

Scorecard review with all parties is completed via teleconference, real-time chat, e-mail, or in person. Finally, the scorecard is modified, approved, and archived via the computerized system 100, as further discussed below with reference to FIG. 9. Scorecard review may produce workflow for the vendor and/or the vendor manager, as further discussed below with reference to FIG. 10. Through scorecard review, or for other reasons, the vendor manager may decide to change one or more audit questions, as further discussed below with reference to FIG. 11. Thus, the computerized system 100 provides a complete and substantially automated tool for accomplishing previously burdensome administrative tasks.

When considering the computerized systems and methods disclosed herein, it should be appreciated that the logical operations of various embodiments of the present invention for improved handling of vendor referrals and for enhanced vendor self-audits may be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated herein, and making up the embodiments of the present invention described herein are referred to variously as operations, structural devices, acts, actions or modules. It will be recognized by one skilled in the art that these operations, structural devices, acts and modules may be implemented in software, in firmware, in special purpose digital logic, and any combination thereof without deviating from the spirit and scope of the present invention as recited within the referrals attached hereto.

Referring to FIG. 1, a computerized system 100 for improved vendor referrals process auditing includes a database module 102 and an interface module 104. The database module 102 is configured to store and retrieve a plurality of vendor referrals 106, vendor audits 108, and vendor status records 110 within one or more known data structures such as, for example, an SQL database 112. Each vendor status record 110 may include one or more workflow schedules 936, as further discussed below with reference to FIG. 9. It will be appreciated that alternative data architectures and protocols could also be used for the database with appropriate modifications to the database module 102. Additionally, announcements 114 and user credentials 116 may be stored within the database 112 or in a separate database also maintained by the database module 102. The interface module 104 is configured to provide a graphical user interface (GUI) 118, at any of a plurality of client machines 120. Through the GUI 118 presented by the interface module 104, any of a plurality of authorized users may provide data or queries to the database module 102, which accesses the SQL database 112.

Figure 2:
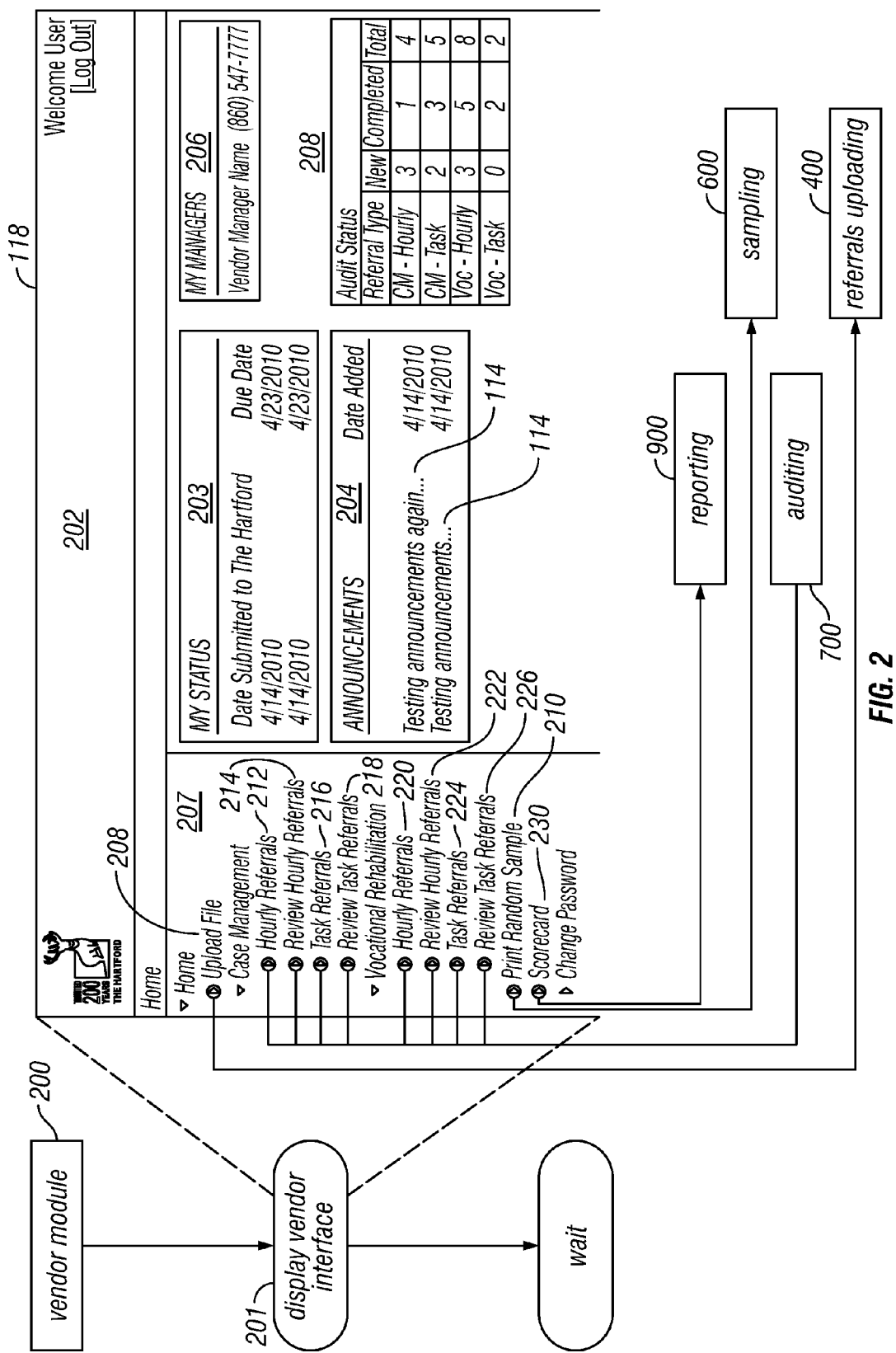
FIG. 2 shows a vendor module and interface implemented by the computerized system shown in FIG. 1.
Figure 3:
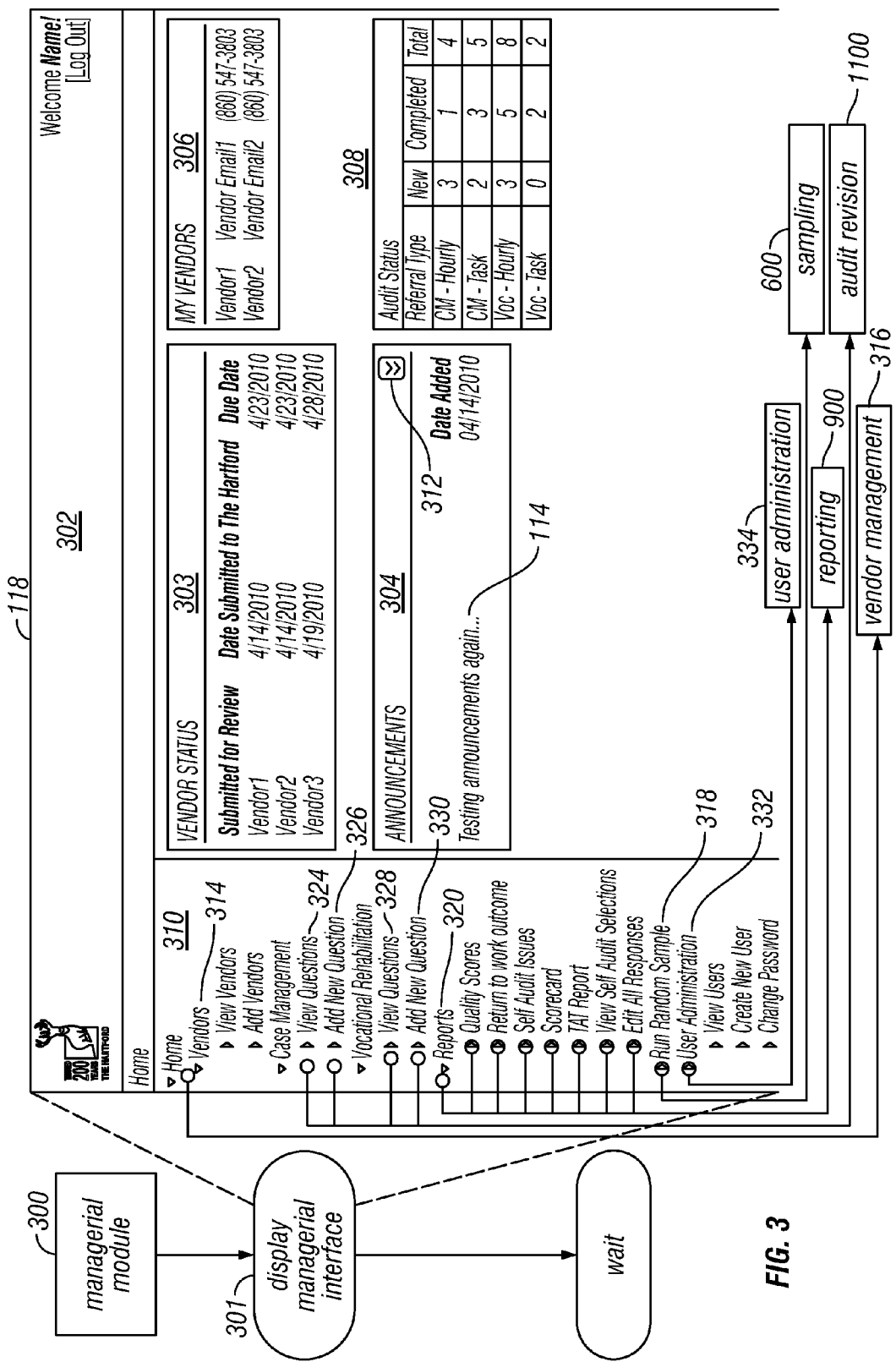
FIG. 3 shows a managerial module and interface implemented by the computerized system shown in FIG. 1.

Still referring to FIG. 1, the interface module 104 includes a vendor module 200 (shown in FIG. 2) and a managerial module 300 (shown in FIG. 3). Each module provides specified groups of authorized users with access to selected processes for handling and auditing vendor referrals submittals. At a step 126 when the interface module 104 is first accessed via the GUI 118, the interface module 104 displays a login screen 128. At a step 130, the interface module 104 receives login credentials, and at a step 132, the interface module 104 determines based on the login credentials whether to activate the vendor module 200 or the managerial module 300, or whether to loop to step 126.

Referring to FIG. 2, when activated by the interface module 100, the vendor module 200 performs a step 201 of modifying the GUI 118 to display a vendor interface 202, which any member from an authorized group of service vendors may access in a vendor role. Preferably, each member from the authorized group of vendors is separately credentialed with their own login and password. The vendor interface 202 provided by the vendor module 200 includes a vendor status section 203, an announcements section 204, a contacts section 205, an audit section 206, and a links bar 207.

The vendor status section 203 displays, to each vendor user, the due date and progress associated with that vendor's next scheduled referrals data upload, according to the corresponding vendor status record 110 maintained in the SQL database 112.

The announcements section 204 displays a linked list of announcements 114 applicable to the particular vendor user. By clicking any link within the list of announcements 114, a vendor user may view a copy of a vendor manager announcement 114 applicable to the vendor.

The contacts section 205 displays a linked list of vendor manager personnel whom the vendor user is authorized to contact regarding referrals information, the auditing module 700, the vendor interface, or related issues. By clicking a link within the contacts section 205, the vendor user may initiate communication with a vendor manager user, either through the vendor interface 202 or through a separate device or interface.

The audit section 206 displays a due date and progress associated with the vendor's next scheduled self-audit, based on the vendor status record 110.

The vendor links bar 207 includes an "Upload File" link 208, by which a vendor can access a referrals uploading module 400 (shown in FIG. 4) for submitting one or more referrals to the database module 102; a "Print Random Sample" link 210, by which a vendor can activate a sampling module 600 (shown in FIG. 6) to view a sample 606 of referrals previously selected by a manager-activated instance of the sampling module 600; a plurality of "Referrals" links and "Review Referrals" links 212, 214, . . . , 224, 226, each corresponding to one of a plurality of pre-determined types of referrals (e.g. links for hourly or task-billed case management or vocational rehabilitation services reimbursement referrals, as shown in FIG. 2), each of the several links providing access to an auditing module 700 (shown in FIG. 7) through which a vendor may answer a plurality of audit questions regarding a subset of referrals, within the sample 606, corresponding to the particular audit link; and a "Scorecard" link 230, by which a vendor can access an audit reporting module 900 (shown in FIG. 9) for displaying results of the auditing module 700.

Referring now to FIG. 3, when activated by the interface module 104, the managerial module 300 performs a step 301 of modifying the GUI 118 to display a managerial interface 302, which any member from an authorized group of insurer employees may access in one of three vendor manager roles according to the member's login credentials. The vendor manager roles include supervisor, administrator, and user roles. The managerial interface 302 provided by the managerial module 300 includes a manager status section 303, an announcements management section 304, a contacts management section 306, an audit management section 308, and a manager links bar 310. The managerial interface 302 affords to each vendor manager user appropriate access to functions affecting each vendor associated with that vendor manager user.

The manager status section 303 displays a list of all vendors associated with the vendor manager viewing the managerial interface 302, along with the due date and progress associated with each vendor's next scheduled referrals information upload, based on the plurality of vendor status records 110 associated with the vendor manager user accessing the managerial interface 302. Clicking on a vendor link within the manager status section 303 causes the managerial module 300 to display the status of the linked vendor's most recent audit 736 in the audit management section 308.

The announcements management section 304 displays a list of all announcements 114 issued by the vendor manager user or affecting vendors associated with the vendor manager user, along with the read/unread status of each announcement 114. The announcements management section 304 also includes a link 312 for creating a new announcement directed to vendor manager users and/or to one or more of the vendors associated with the vendor manager user.

The contacts management section 306 displays a linked list of vendors associated with the vendor manager user accessing the managerial interface 302, along with contact information for each vendor in the list. By clicking a link within the contacts management section 306, the vendor manager user may initiate communication with a vendor user, either through the managerial interface 302 or through a separate device or interface.

The manager links bar 310 includes a "Vendors" link 314, through which the vendor manager user may access a vendor management process 316 for adding, deleting, or editing vendors, and a "Run Random Sample" link 318 for activating a managerial instance of the sampling module 600 (shown in FIG. 6) to generate a new random sample from submitted referrals associated with a presently-selected vendor, or to display a previously-generated random sample associated with a presently-selected vendor. The links bar 310 also includes a "Reports" link 320, through which a vendor manager user may activate the audit reporting module 900, which modifies the managerial interface 302 to display managerial controls 910 for viewing audit results associated with a selected vendor, as further discussed below with reference to FIG. 9. The links bar 310 also includes a plurality of audit revision links 324, 326, 328, 330, through which the vendor manager user may access an audit revision module 1100 (shown in FIG. 10) for adding, deleting, or modifying audit questions associated with each type of referral; and a user administration link 332 for accessing user administration process 334 to add, delete, or modify vendor or vendor manager user data.

While all of the links in the managerial interface 302 are available to vendor manager (insurer) employees acting in a supervisor role, employees acting in a manager role cannot access the user administration link 332. Employees acting in a user role are further limited to accessing only the reports link 322 and the sampling link 318.

Figure 4:
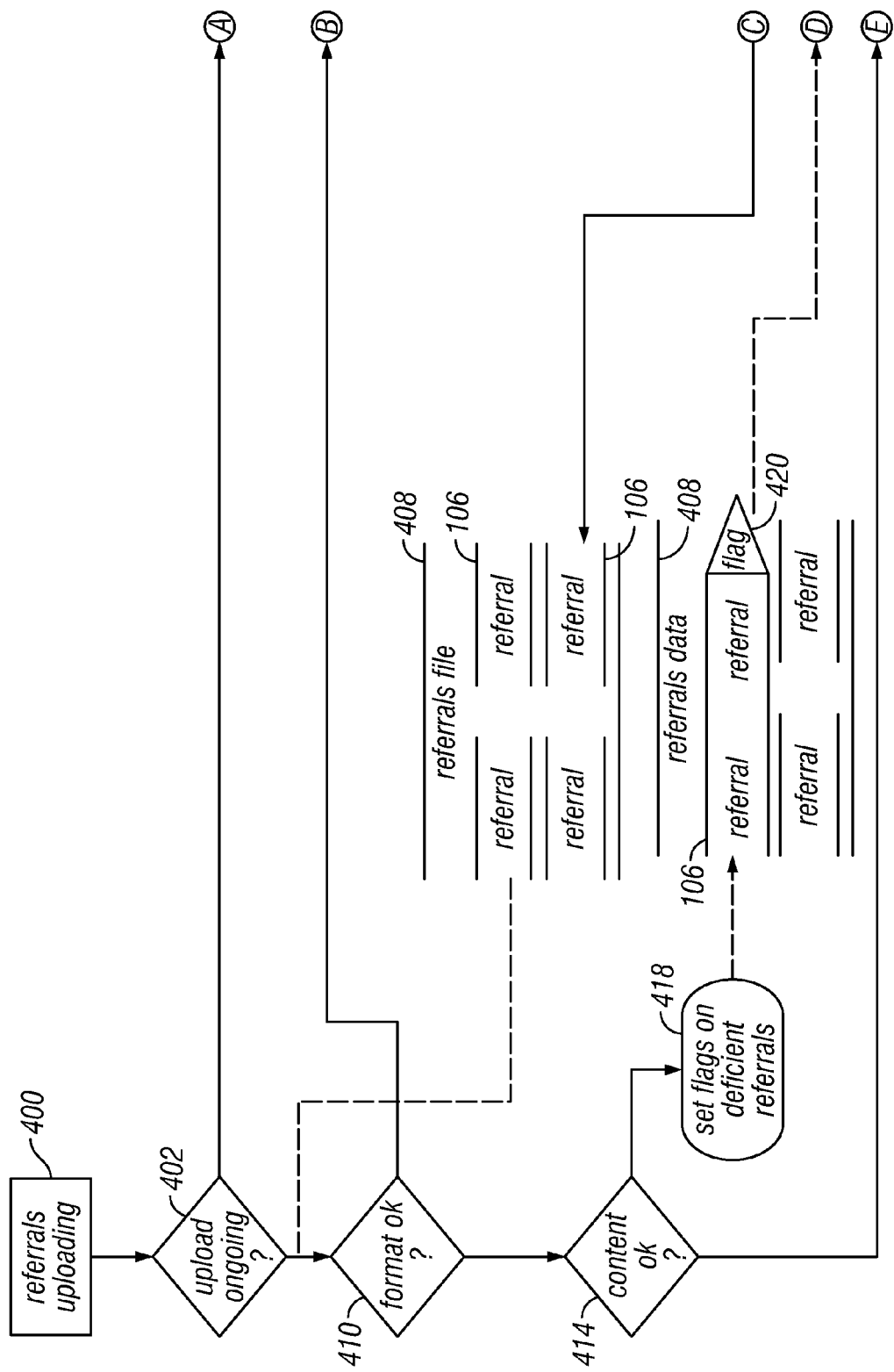
FIG. 4 shows a flowchart of a referrals uploading process implemented by the computerized system and interface shown in FIGS. 1 and 2.
Figure 4:
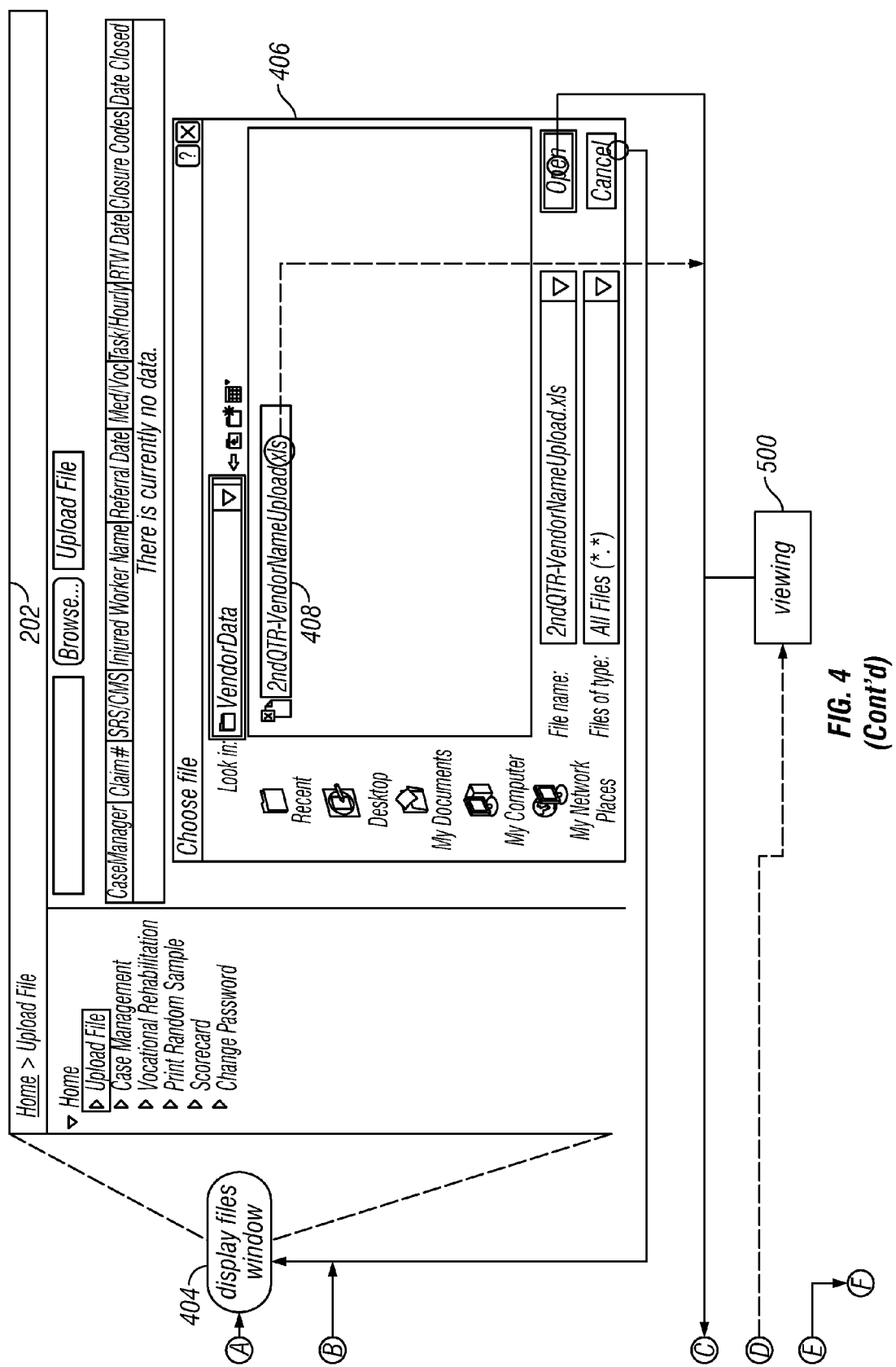
Figure 4:
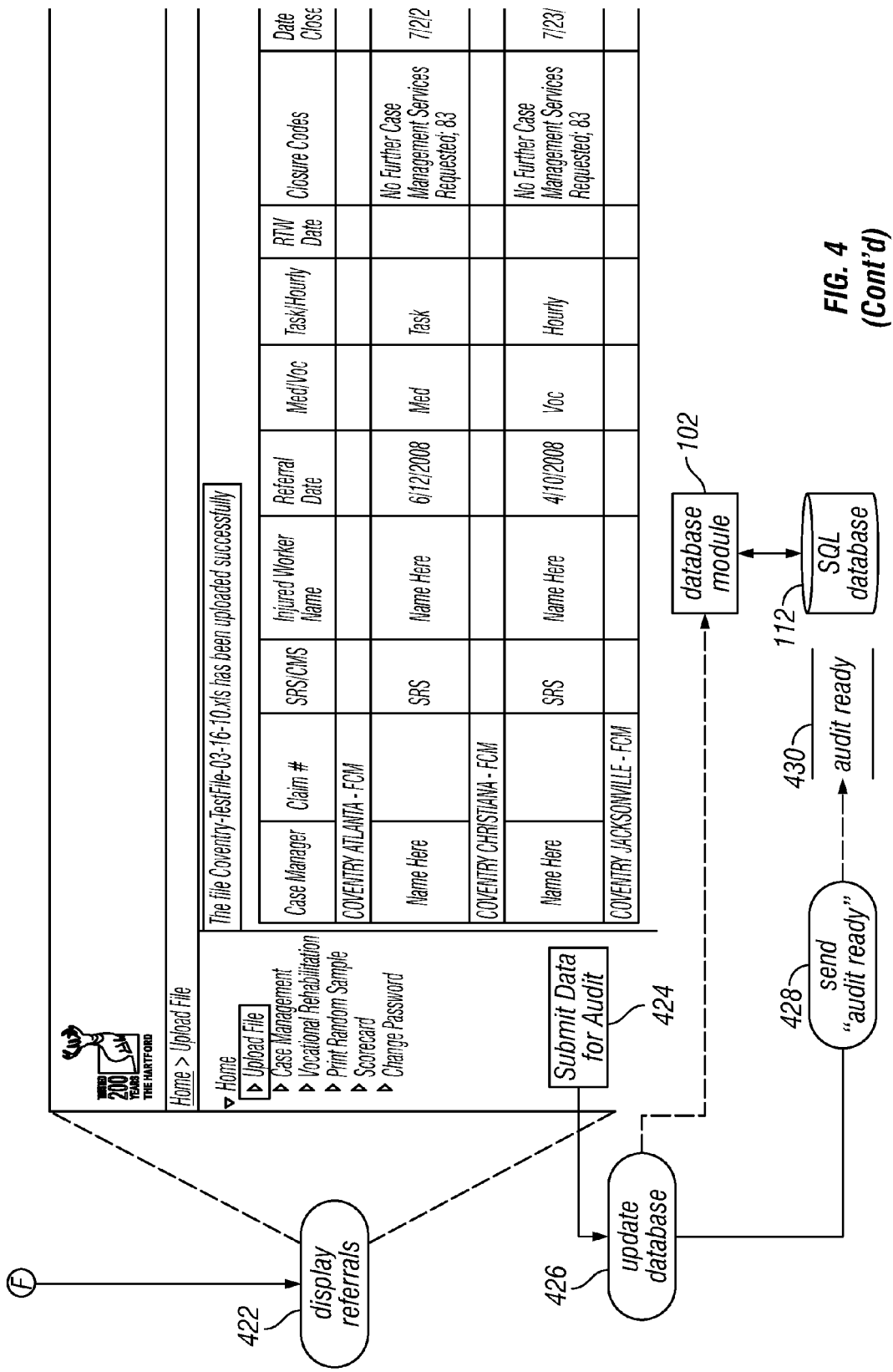

Referring to FIG. 4, when activated at a step 402, the referrals uploading module 400 checks whether an upload already is in process. If no file is being processed for upload, at a step 404 the referrals uploading module 400 displays a file window 406 within or over the vendor interface 202, or implements an equivalent conventional technique for choosing a file 408 to be uploaded. Once the vendor user has chosen the file 408, then at a step 410 the uploading module 400 checks the file 408 to verify that the file has an appropriate format for handling by the database module 102.

If the file 408 does not have an appropriate format, then the uploading process loops to step 404. If the selected file 408 does have an appropriate format, then at a step 414, the uploading module 400 also verifies that each referral 106 within the file 408 includes all required information for handling by other processes.

At a step 418, the uploading module 400 sets a flag 420 on each referral 106 that does not meet informational requirements. The uploading module 400 then activates a viewing module 500 for displaying and editing the uploaded referrals 106 via the vendor interface 202, as further discussed below with reference to FIG. 5. On return from the viewing module 500, the uploading module 400 repeats steps 410 through 418 to clear flags 420 from referrals 106 that newly meet informational requirements. If any flags remain, then the uploading module 400 re-activates the viewing module 500. When all flags 420 have been cleared, the uploading module 400 proceeds to a step 422 of displaying the cleared referrals 106 along with a "Submit Data for Audit" button 424. Clicking on the "Submit Data for Audit" button 424 causes the uploading module 400 to perform a step 426 of passing all of the displayed referrals 106 to the database module 102, and a step 428 of sending an "audit ready" notification, e-mail, or announcement 430 to a vendor manager user associated with the vendor user.

Figure 5:
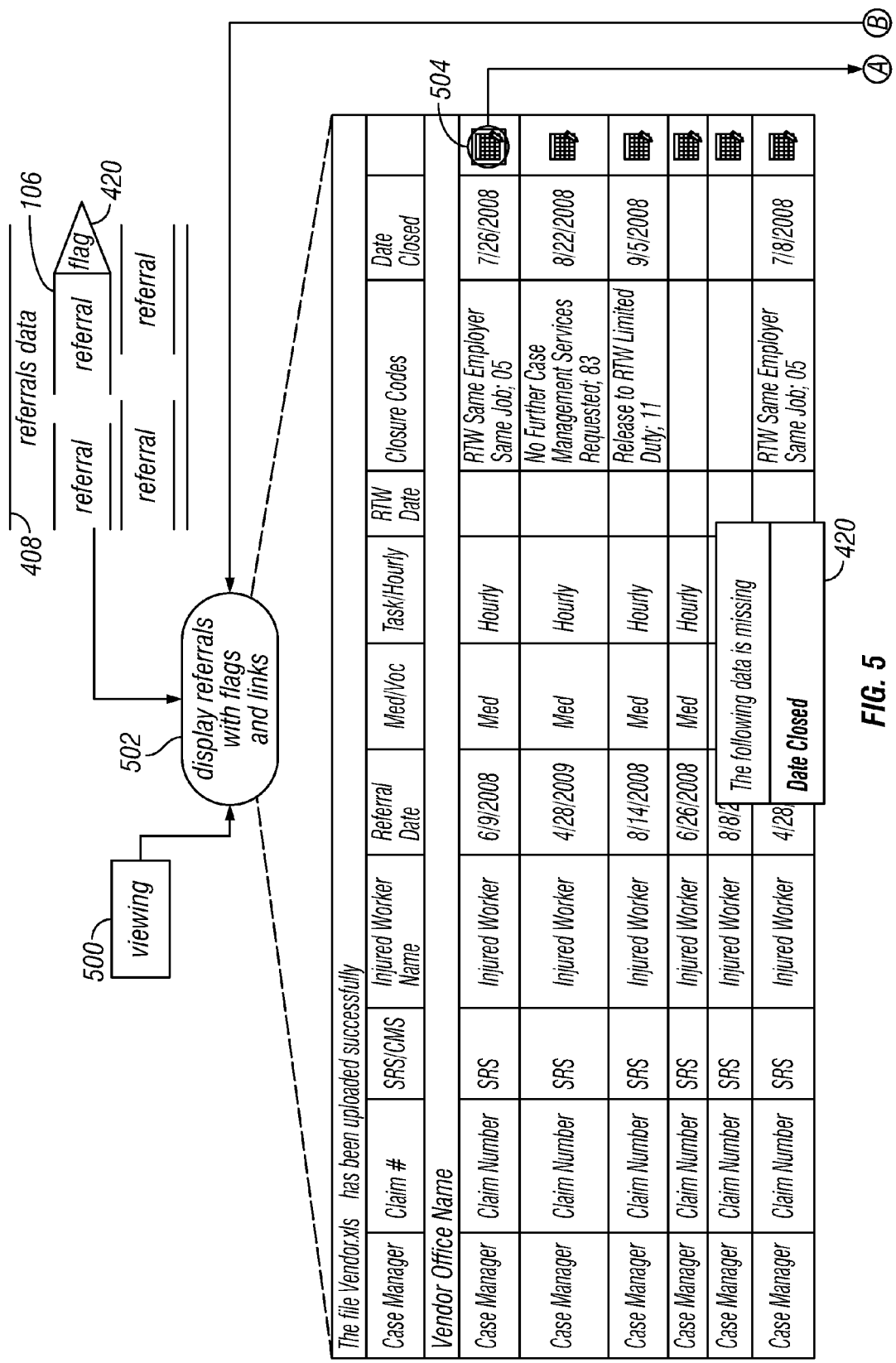
FIG. 5 shows a flowchart of a viewing and editing process implemented by the computerized system and interface shown in FIGS. 1 and 2.
Figure 5:
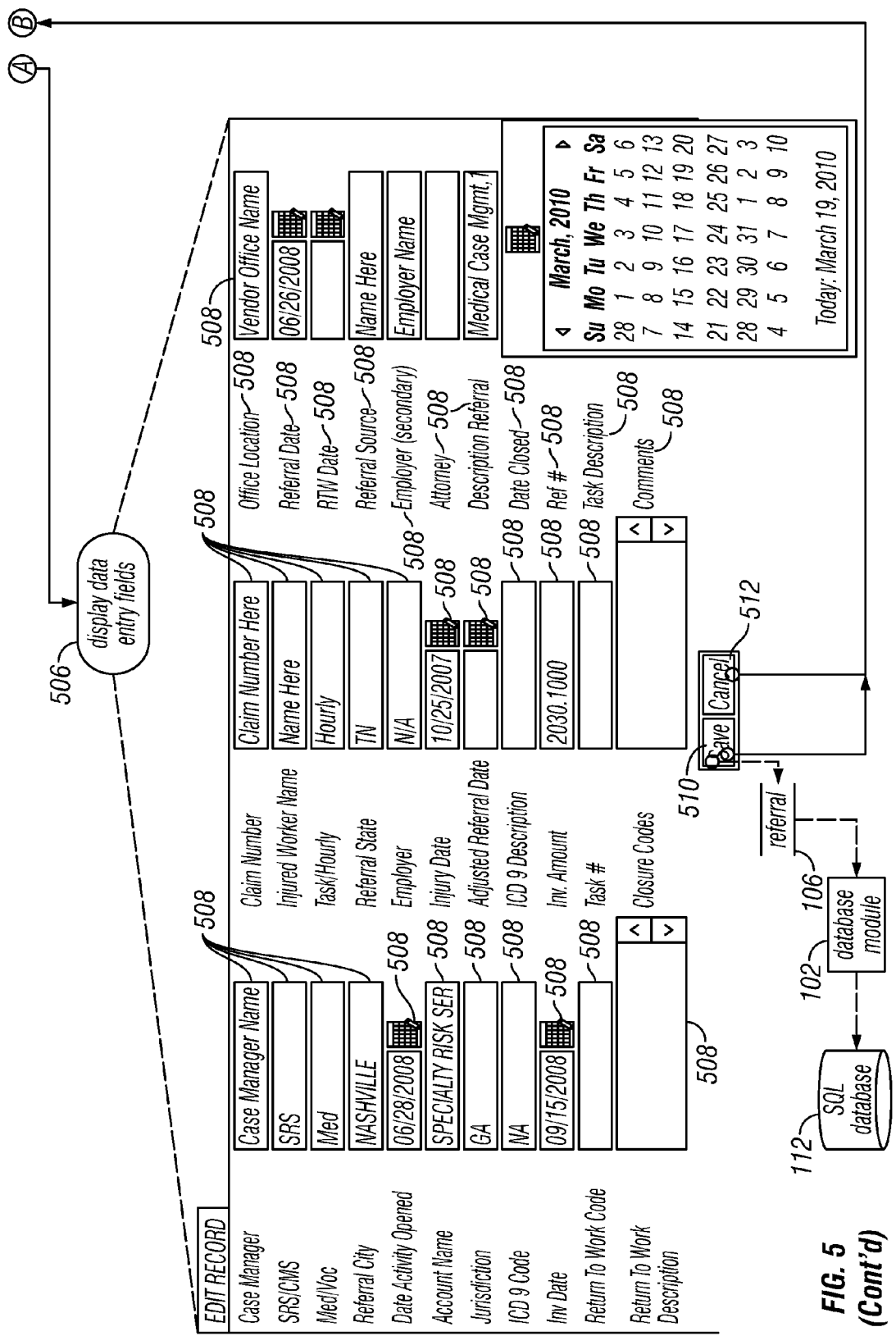

Referring to FIG. 5, when activated at a step 502, the viewing module 500 modifies the vendor interface 202 to display selected information from each referral 106 passed by the uploading module 400, while highlighting each referral 106 that has a flag 420 previously set by the uploading module 400. Additionally, at step 502 the viewing module 500 displays with each referral 106 an edit link 504. When a click is received on a highlighted referral 106, then the viewing module 500 displays a pop-up window explaining the relevant flag 420.

Still referring to FIG. 5, at a step 506, in response to a click received on one of the edit links 504, the viewing module 500 displays data entry fields 508 for modifying the referral 106 corresponding to the edit link 504. At step 506, the viewing module 500 also displays a "Save" button 510 for modifying the referral 106 to match the data entered in the fields 508 and for passing the modified referral 106 to the database module 102; and a "Cancel" button 512.

The viewing module 500 can be accessed at any time via the vendor interface 202 for viewing and editing the most recently uploaded referrals 106, at least until all of the flags 420 have been cleared.

Figure 6:
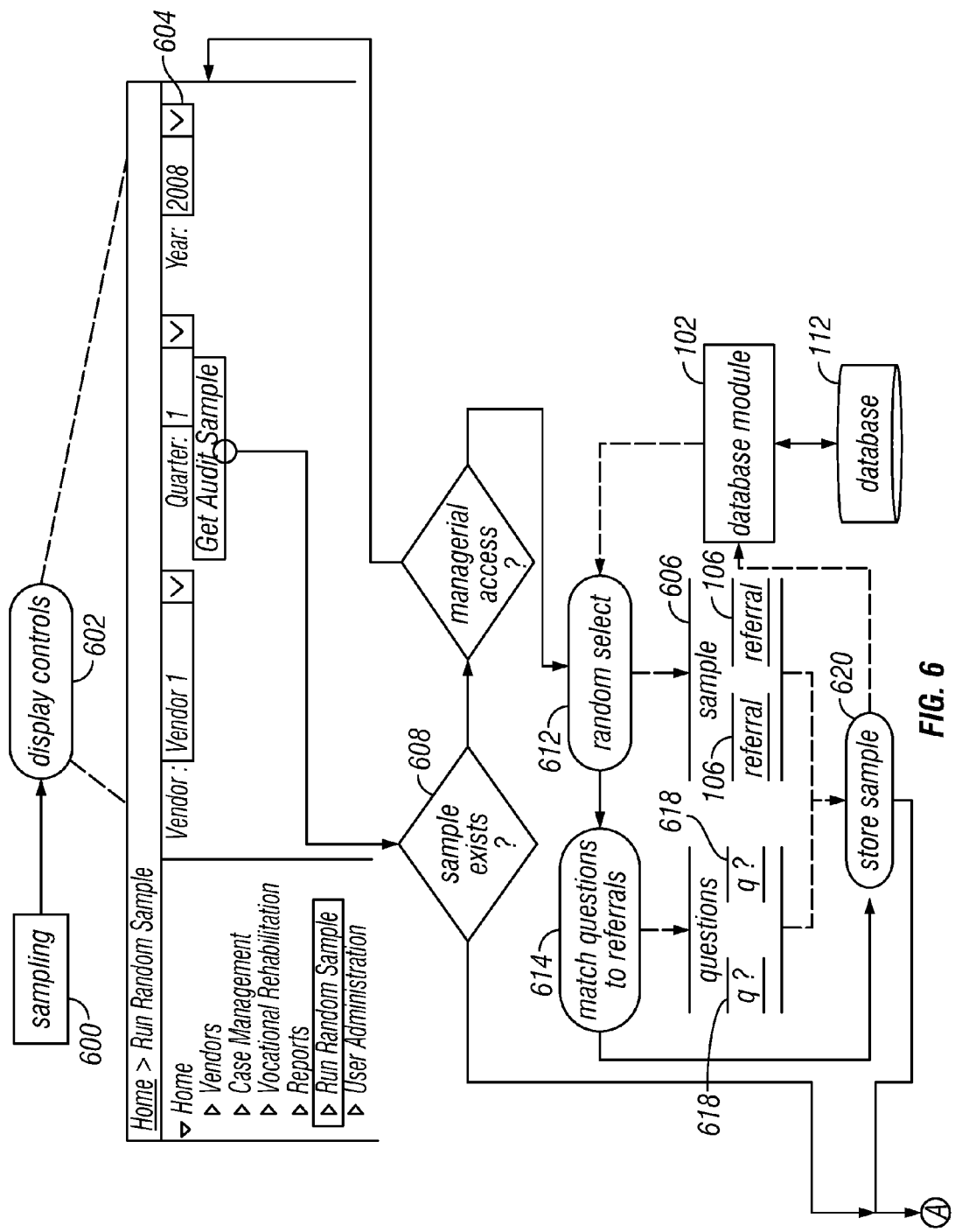
FIG. 6 shows a flowchart of a sampling process implemented by the computerized system shown in FIGS. 1 and 3.
Figure 6:
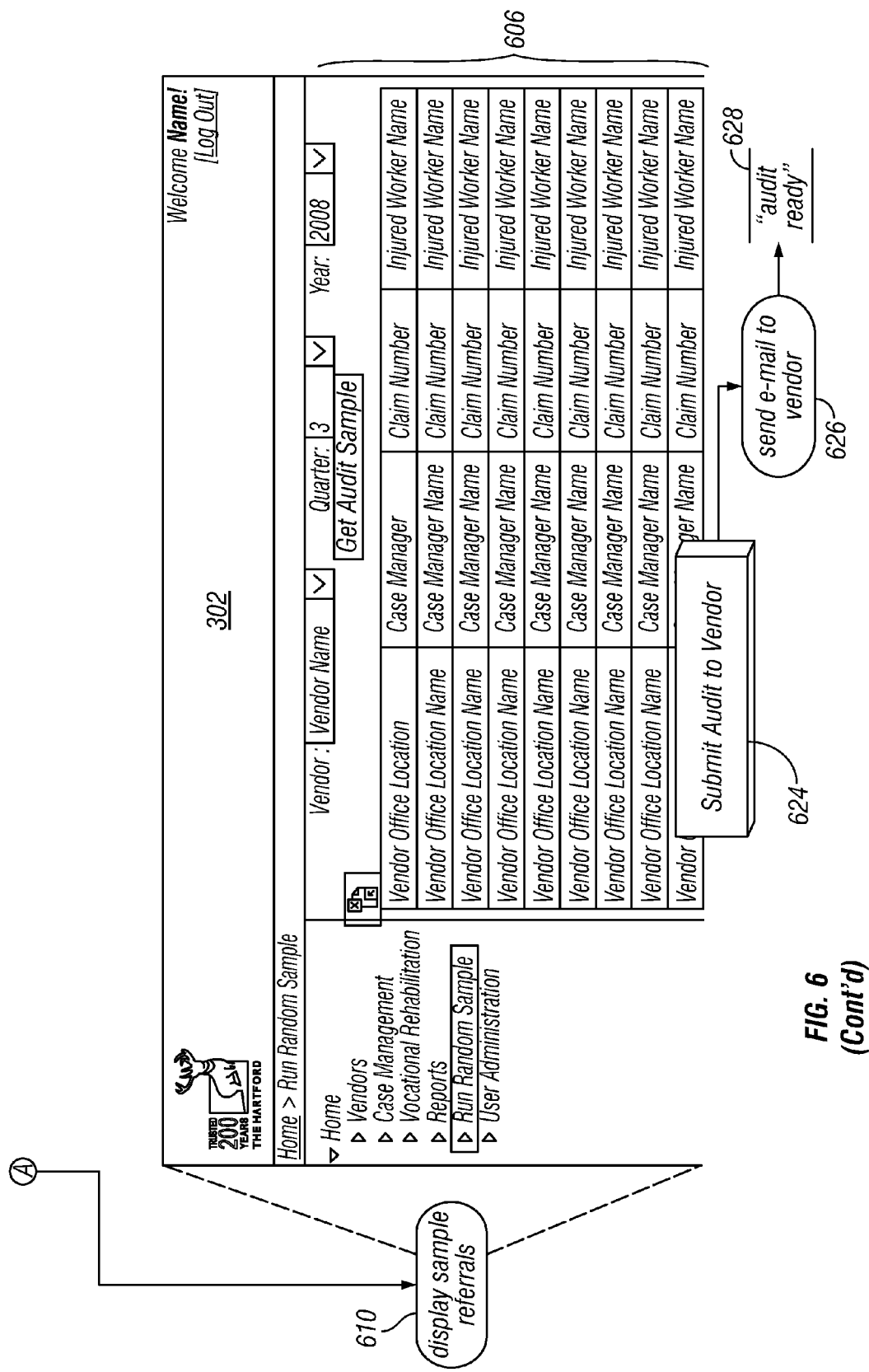

Referring to FIG. 6, and as discussed above with reference to FIGS. 2 and 3, the referrals sampling module 600 can be accessed via the vendor interface 202 or via the managerial interface 302. When accessed via the managerial interface 302, at a step 602 the referrals sampling module 600 displays controls 604 for querying the database module 102 to obtain a sample 606 of referrals 106 matching a vendor and a time period. At a step 608, in response to actuation of the controls 604, the sampling module 600 queries the database module 102. If a sample 606 matching the vendor and time period already exists, then at a step 610 the sampling module 600 displays the sample 606 via the managerial interface 302. Each selected referral (e.g., the services provided by the vendor for the insured or covered person or entity) is related to a claim file for the insured. However, if no sample yet exists corresponding to the vendor and time period, then at a step 612 the referrals sampling module 600 takes in random order no less than five (5) referrals up to ten percent (10%) of the referrals 106, but no more than twenty five (25) referrals total, to produce the random sample 606. The sampling module may also increase the likelihood of certain referrals being selected based on the data in the referral. For example, a certain type of service may be more likely to be problematic based on past history or the nature of the service. In this case, the sample would still be random but certain outcomes would be more likely resulting in a more effective audit to uncover issues to be addressed.

At a step 614, the sampling module 600 matches suitable audit questions 618 to each referral 106 in the sample 606, based on the type of insured service associated with each referral. The vendor manager may predetermine which audit questions 618 correspond to each type of referral, via the audit revision module 1100, as further discussed below with reference to FIG. 11. Optionally, the sampling module 600 may randomly select audit questions 618 from a larger set of questions predetermined by the vendor manager, or may consult a workflow within the vendor status record 110 to select specific audit questions 618 based on previous vendor scorecards 806, as further discussed below with reference to FIGS. 8 and 10.

At a step 620, the sampling module 600 stores the random sample 606, including referrals 106 and questions 618, back to the database 112 via the database module 102. The sampling module 600 then performs step 610 of displaying the random sample 606, along with a "Submit Audit to Vendor" button 624. At a step 626, in response to a click received via the "Submit Audit to Vendor" button 622, the sampling module 600 sends an "audit ready" e-mail 628 to the vendor whose referrals 106 are in the sample 606. Optionally, the "audit ready" e-mail can include a link for automatically accessing the sample 606 via the "Print Sample" link of the vendor interface 202. Alternatively, an "audit ready" notification can be provided via an announcement 114 displayed in the vendor interface 202.

When accessed via the vendor interface 202, the sampling module 600 performs step 602 of displaying controls 604. However, the control for selecting a vendor displays only the vendor viewing the vendor interface 202. Additionally, when accessed via the vendor interface 202, if no sample yet exists corresponding to the time period selected by the vendor viewing the vendor interface 202, then the sampling module 600 does not obtain a random sample based on the vendor's instructions, but instead displays a blank screen, optionally including an error message. If a sample 606 already has been generated via a managerial instance of the sampling module 600, then the sampling module 600 displays that sample via the vendor interface 202.

Figure 7:
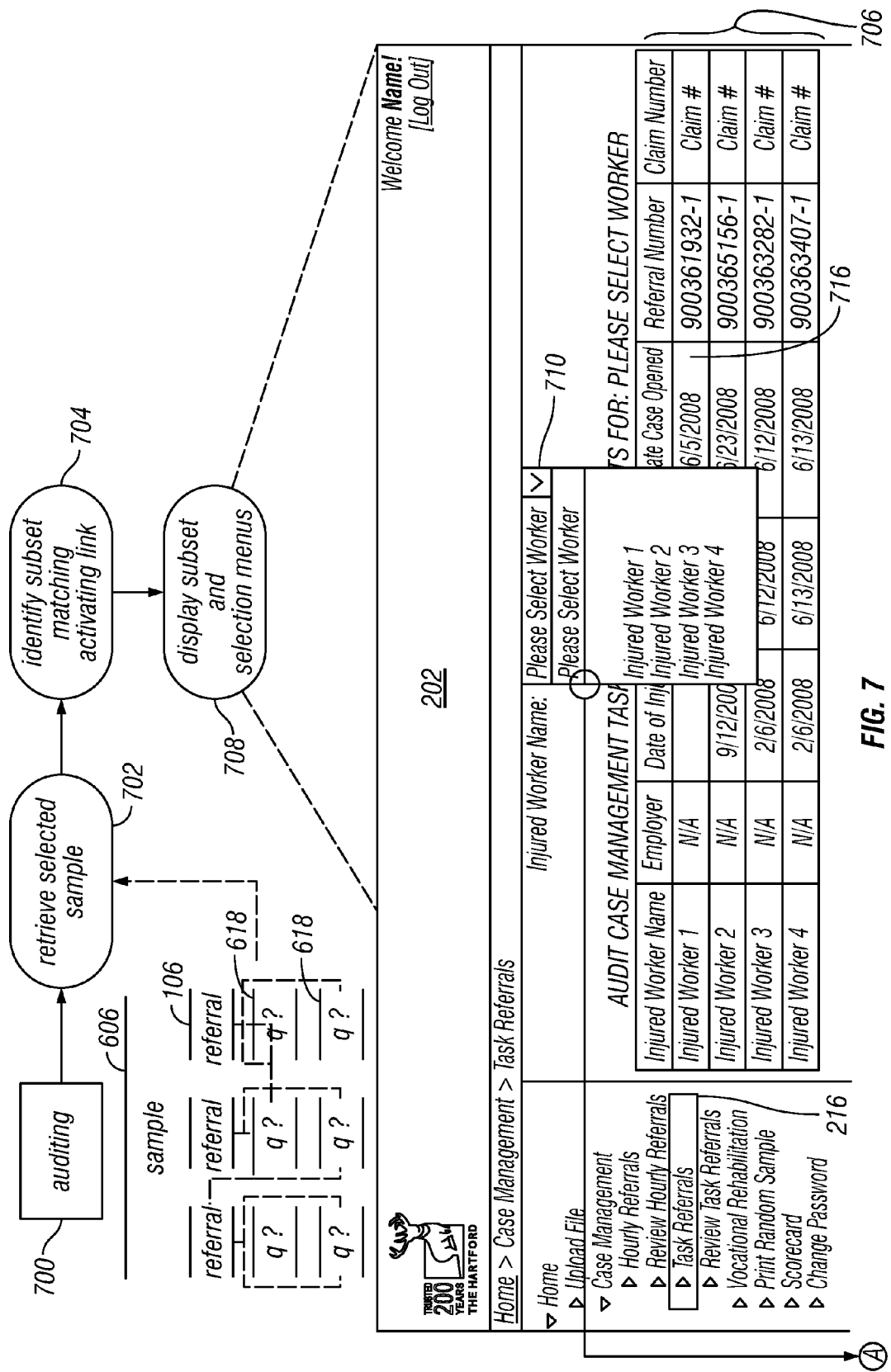
FIG. 7 shows a flowchart of an auditing module 700 implemented by the computerized system and interface shown in FIGS. 1 and 2.
Figure 7:
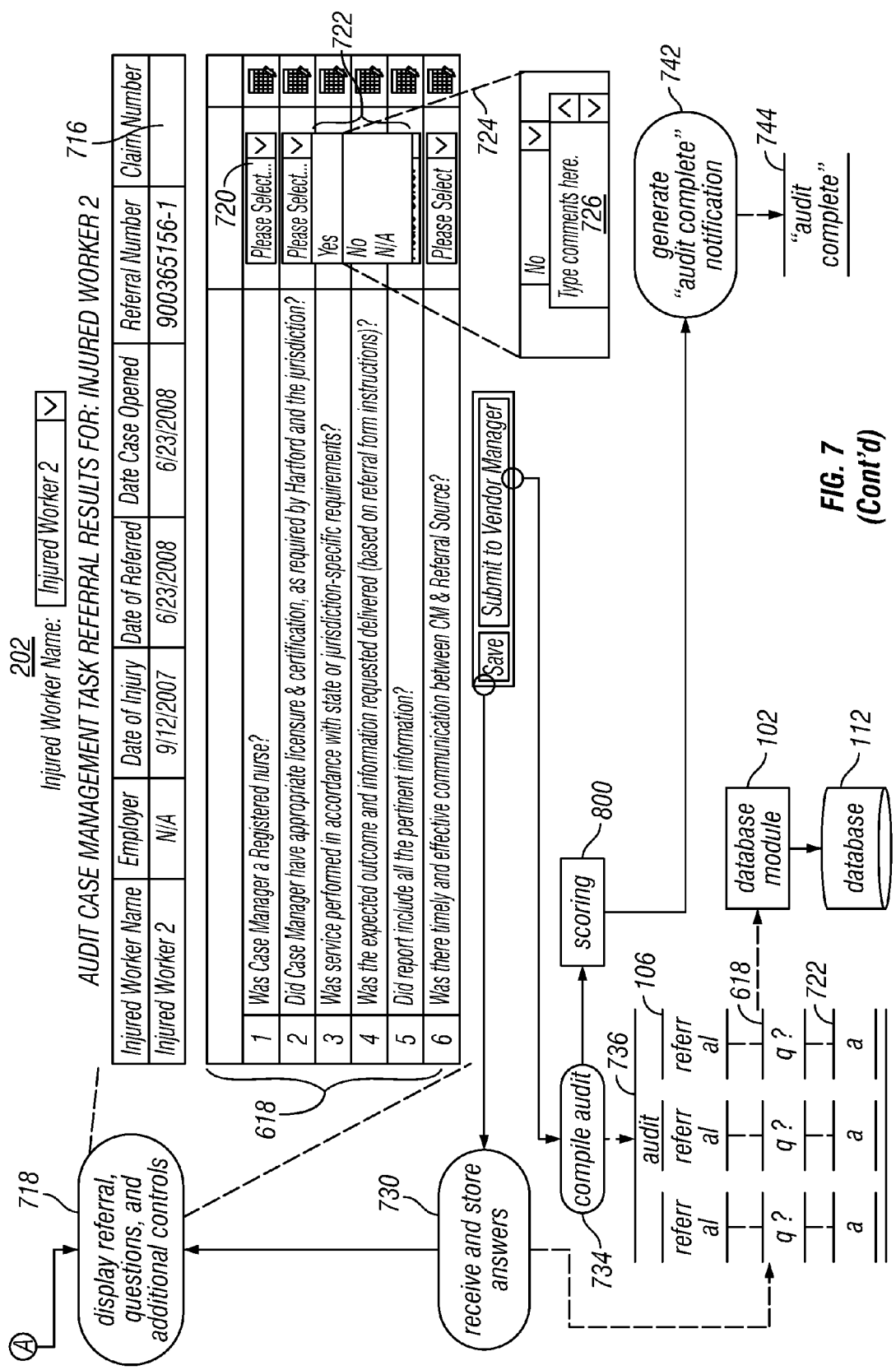

Referring to FIG. 7, the auditing module 700 is accessible via any of the plurality of audit links 212, . . . , 226 included in the links bar 207 of the vendor interface 202, as also shown in FIG. 2. When activated, the auditing module 700 performs a step 702 of retrieving from the database module 102 the most recent random sample 606 generated for the vendor by a managerial instance of the sampling module 600 (shown in FIG. 6). However, if an audit already has been completed for the most recent random sample, then the auditing module 700 merely displays the vendor interface 202.

If an audit has not yet been completed for the most recent random sample 606, then at a step 704, the auditing module 700 identifies a subset 706 of the random sample 606, wherein each referral in the subset 706 has a claim type and an audit status matching the activating audit link 212, . . . , or 226. For example, referring also to FIG. 2, a subset of referrals retrieved via "Referrals" link 216 would contain only hourly case management service referrals for which no audit questions 618 had yet been answered, while a subset of referrals retrieved via "Review Referrals" link 224 would contain only task-billed case management service referrals for which at least some of the matching audit questions 618 had been answered.

At a step 708, the auditing module 700 displays the subset 706 along with a pull-down menu 710 for selecting a referral 716 from the subset 706. Activating the referral-selection pull-down menu 710 causes the auditing module 700 to perform a step 718 of displaying the selected referral 716, along with the audit questions 618 assigned to the selected referral 716 by the sampling module 600. The sampling module 600 assigns appropriate questions to each referral within the sample 606, as further discussed below with reference to FIG. 6.

Still referring to FIG. 7, at step 718 the auditing module 700 also displays in association with each of the audit questions 618 a pull-down menu 720 by which the vendor may select one of a pre-determined set of brief answers 722 to each question 618 regarding the chosen referral 716 (e.g. "Yes", "No", "N/A"). At a further step 724, when the vendor selects any of a pre-determined subset of the brief answers 720 (e.g. "No", "N/A"), the auditing module 700 further displays a text box 726 for receiving additional information from the vendor.

At step 718, the auditing module 700 also displays a "Save" control 728. When a vendor user actuates the "Save" control 728, then at a step 730 the auditing module 700 saves to the database 112, through the database module 102, an audit record 736 reflecting the then-present state of the audit questions 618, the brief answers 722, and any additional information entered into text boxes 726. Additionally, if the auditing module 700 was accessed via one of the "Review Referrals" links 214, 218, 222, 226, then at step 718 the auditing module 700 also displays a "Submit to Vendor Manager" control 732. When a vendor user actuates the "Submit to Vendor Manager" control 732, at a step 734 the auditing module 700 compiles the referrals 716, audit questions and brief answers 618, 722 into the audit record 736, marks the audit record 736 "complete", and passes the audit record 736 into a scoring module 800, which produces a scorecard 806 as further discussed below with reference to FIG. 8. On return from the scoring module 800, the auditing module 700 displays a file window (not shown) for uploading a vendor billing invoice file to be audited by the insurer. Once the vendor uploads a billing invoice file containing billing invoice data (to include .pdf or .tiff images of invoices), at a step 742 the auditing module 700 then generates an "audit complete" notification 744 to the vendor manager associated with the vendor user. The notification 744 may be in the form of an e-mail or an announcement displayed via the managerial interface 302. In response to the e-mail the vendor manager may access the billing invoice data, as well as the scorecard 806 and the audit record 736, for further processing.

Figure 8:
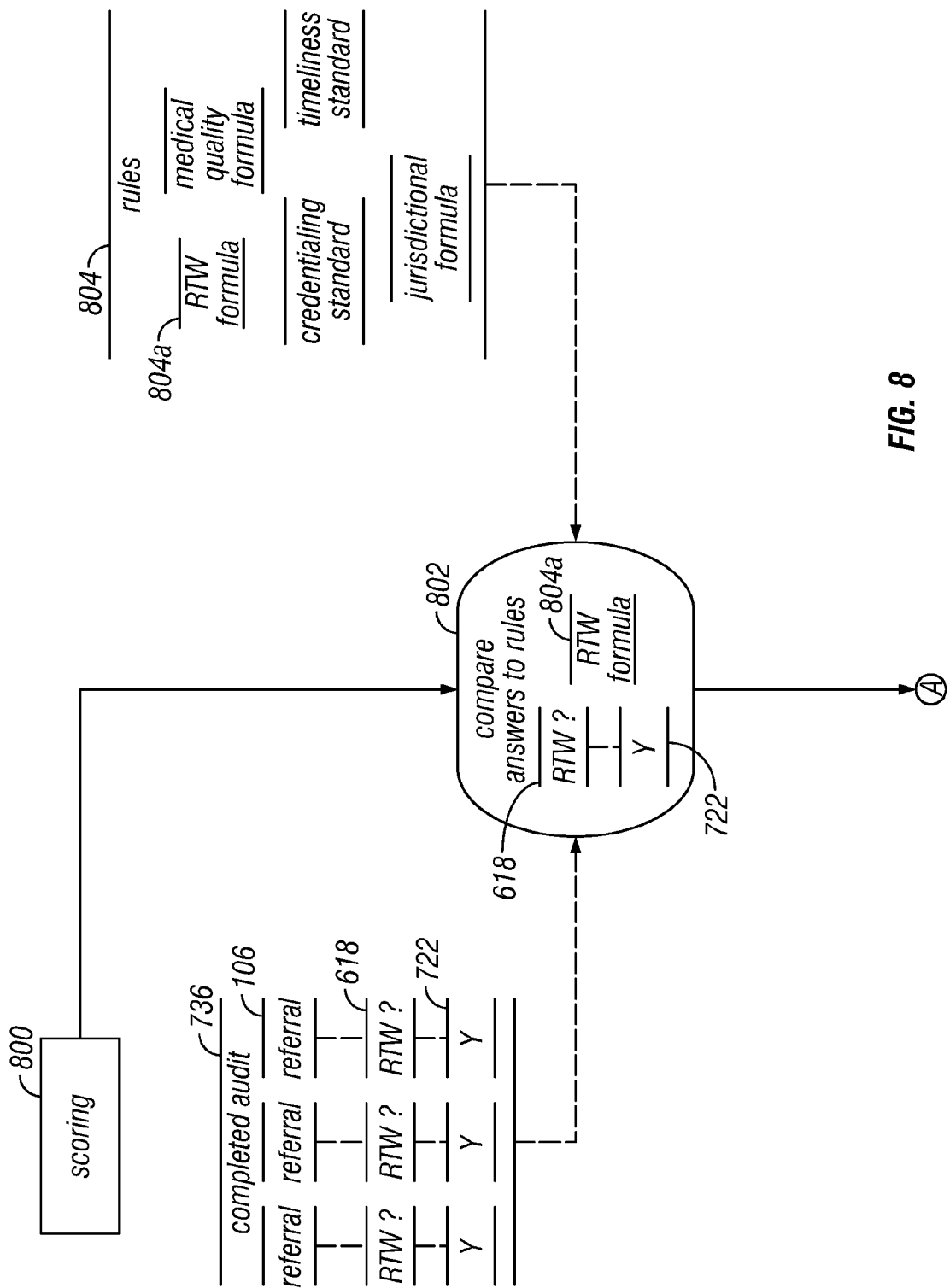
FIG. 8 shows a flowchart of an audit scoring process implemented by the computerized system shown in FIG. 1.

Referring to FIG. 8, at a step 802 the scoring module 800 receives an audit record 736 and assesses at least the brief answers 722 according to pre-determined criteria (e.g. a look up table or a set of rules 804 associated with the questions 618 and referral types within the audit 736). Based on the rules 804, the scoring module 800 generates a scorecard 806 that indicates how the vendor has performed relative to a set of standards 808 predetermined by the insurer. For example, a Return to Work Outcome score 806a is determined, based on the percentage of "Yes" answers to the question "Did the client return to work?", according to a Return to Work weighted formula 804a. Additionally, the scoring module 800 can flag specific referrals 106 or questions 618 that have answers 722 matching "problem" standards identified in the rules 804.

Figure 9:
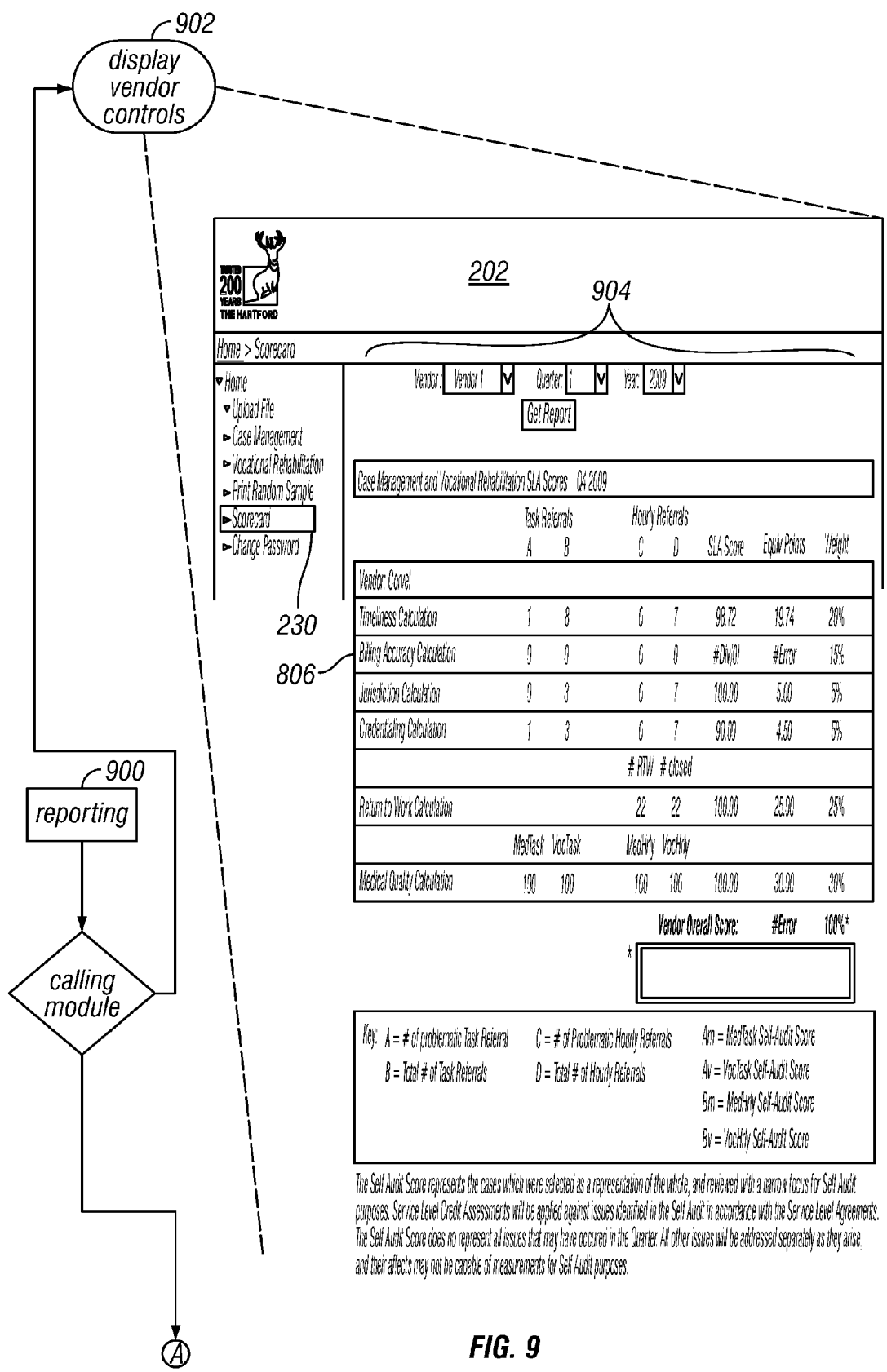
FIG. 9 shows a flowchart of a reporting process implemented by the computerized system and interface shown in FIGS. 1 through 3.
Figure 9:
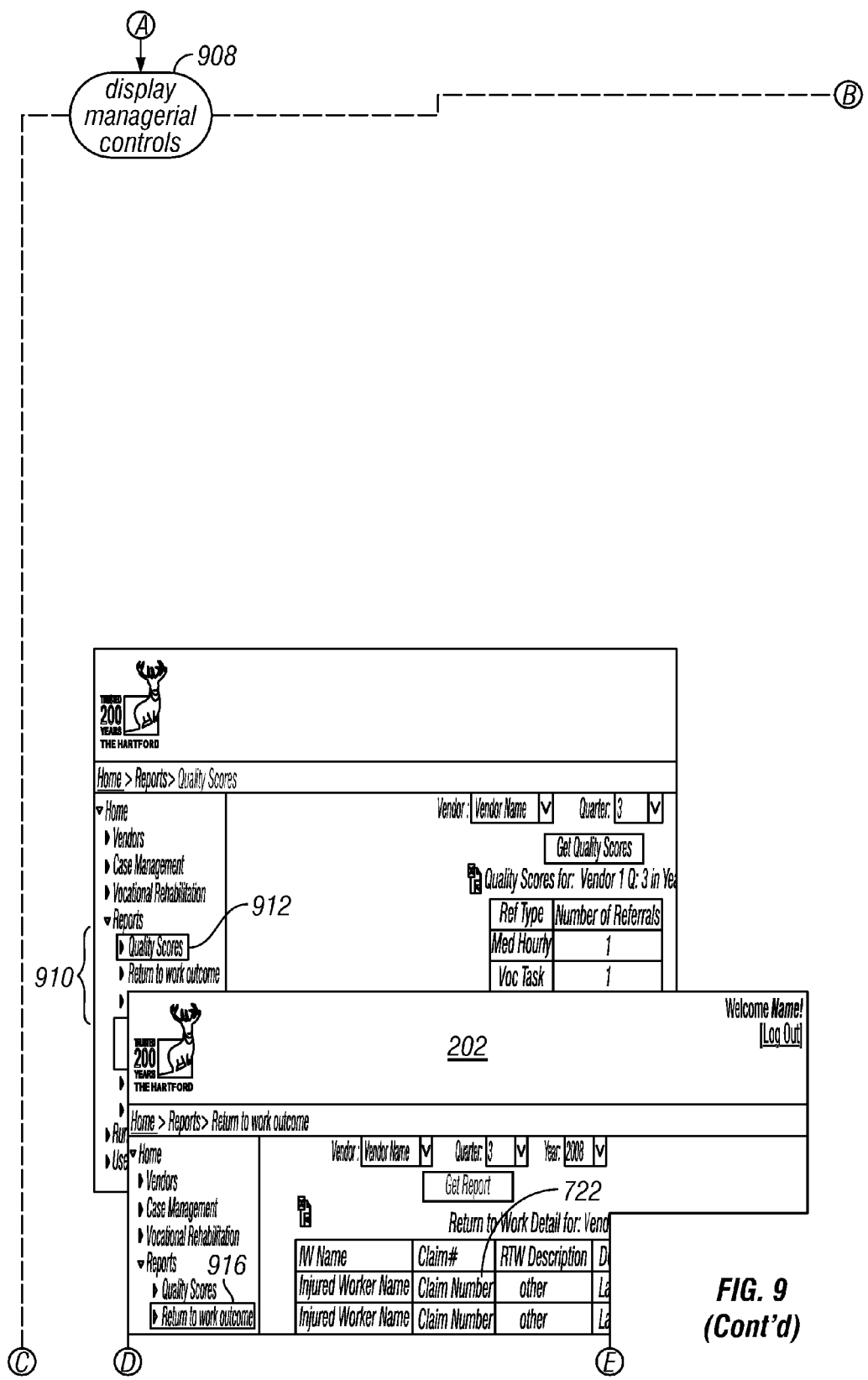
Figure 9:

Referring to FIG. 9, the reporting module 900 can be accessed via the vendor interface 202, or via the managerial interface 302. When accessed via the vendor interface 202, at a step 902 the reporting module 900 displays a selection tool 904 with controls for selecting a vendor and a time period; the vendor is preselected to match the user viewing the tool 904 via the vendor interface 202. On selection of a time period via the tool 904, the reporting module 900 provides a read-only display of the scorecard 806 associated with that time period.

When activated via the managerial interface 302, at a step 908 the reporting module 900 displays managerial controls 910 including a "Quality Scores" link 912 for displaying overall vendor quality scores based on the selected time period; an "Edit All Responses" link 914 for displaying and editing the brief answers 722 corresponding to any particular referral 106 selected from the selected audit 736, along with a text box 909 for entering a manual billing audit score; a "Return to work outcome" link 916 for displaying return-to-work outcome answers 722 from the sample 606 underlying the audit 736; a "Self Audit Issues" link 918 for displaying questions 618 with problematic answers 722 flagged by the scoring module 800; a "Scorecard" link 920 for displaying the scorecard 806 generated based on the selected audit 736; a "TAT Report" link 922 for providing a read-only display of a TAT report 923; and a "View Self Audit Selections" link 924 for displaying the sample 606 underlying the selected audit 736. The managerial controls 910 also include an enhanced selection tool 926, which permits selection of a time period and of a vendor for viewing via the other managerial controls.

For example, on selection of the "Edit All Responses" link 914, the enhanced selection tool 926 provides searchable access to all audits 736 for which an "audit complete" notification 744 has been sent. On selection of an audit 736 via the enhanced selection tool 926, the reporting module 900 provides an editable display 928 of the audit questions and answers 716, 722 along with a "Save" button 930. On receiving a click on the "save" button 922, the reporting module 900 re-initiates the scoring module 800.

On selection of the "Self Audit Issues" link 918, the reporting module 900 displays a list of referrals 106 and questions 618 with problematic brief answers 722 identified by the scoring module 800. The reporting module 900 can also display an "Accept" button (not shown) or similar interface feature for the vendor manager user to acknowledge the listed issues. On receiving acknowledgement from the vendor manager user, the reporting module 900 initiates a routing module 1000.

Figure 10:
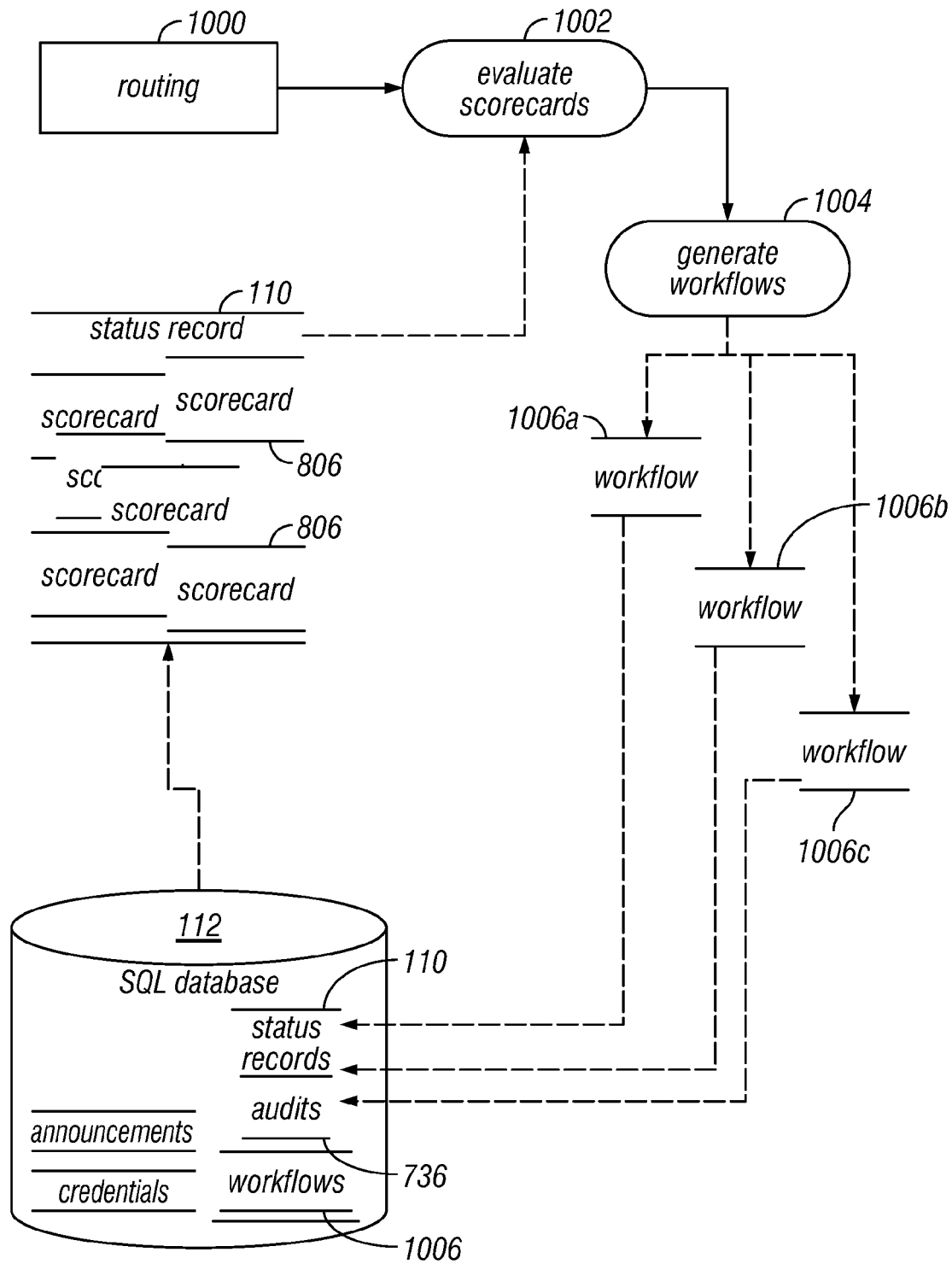
FIG. 10 shows a flowchart of a workflow routing process implemented by the computerized system and interface shown in FIGS. 1 and 3.

Referring to FIG. 10, the routing module 1000, at a step 1002, evaluates the scorecards 806 within a vendor status record 110 to identify significant deficiencies. At a step 1004, the routing module 1000 generates one or more workflows 1006 within the vendor status record 110 based on the most recent scorecard 806 or on a sequence of scorecards 806. For example, if a sequence of scorecards 806 indicates a recurring deficiency with return-to-work outcomes for a specific type of injury, then the routing module 1000 generates a workflow 1006a for alerting a vocational rehab specialist on the insurer's staff to survey the vendor's employee training and certification processes. As another example, in the event that it is determined, based on third party information, that a vendor employee was not appropriately licensed for tasks performed, the routing module 1000 generates a workflow 1006b for reminding the vendor that the vendor employee needs to renew or reinstate their required licensure. As a third example, in the event that a series of scorecards 806 indicate recurring deficiencies in case management, the routing module 1000 generates a workflow 1006c for periodically reminding a vendor case manager to check on specific aspects of each pending referral.

Figure 11:
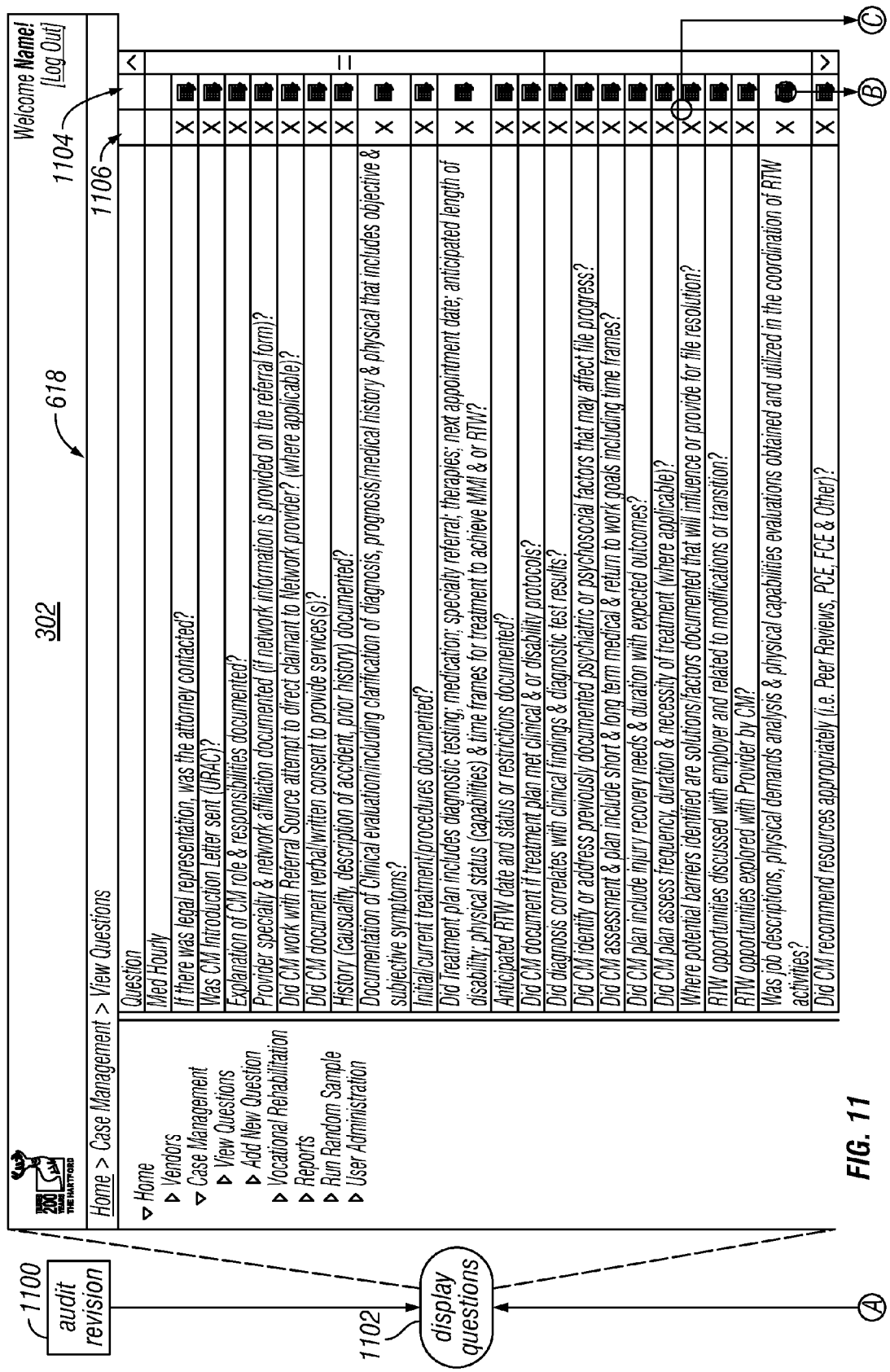
FIG. 11 shows a flowchart of an audit revision process implemented by the computerized system and interface shown in FIGS. 1 and 3.
Figure 11:
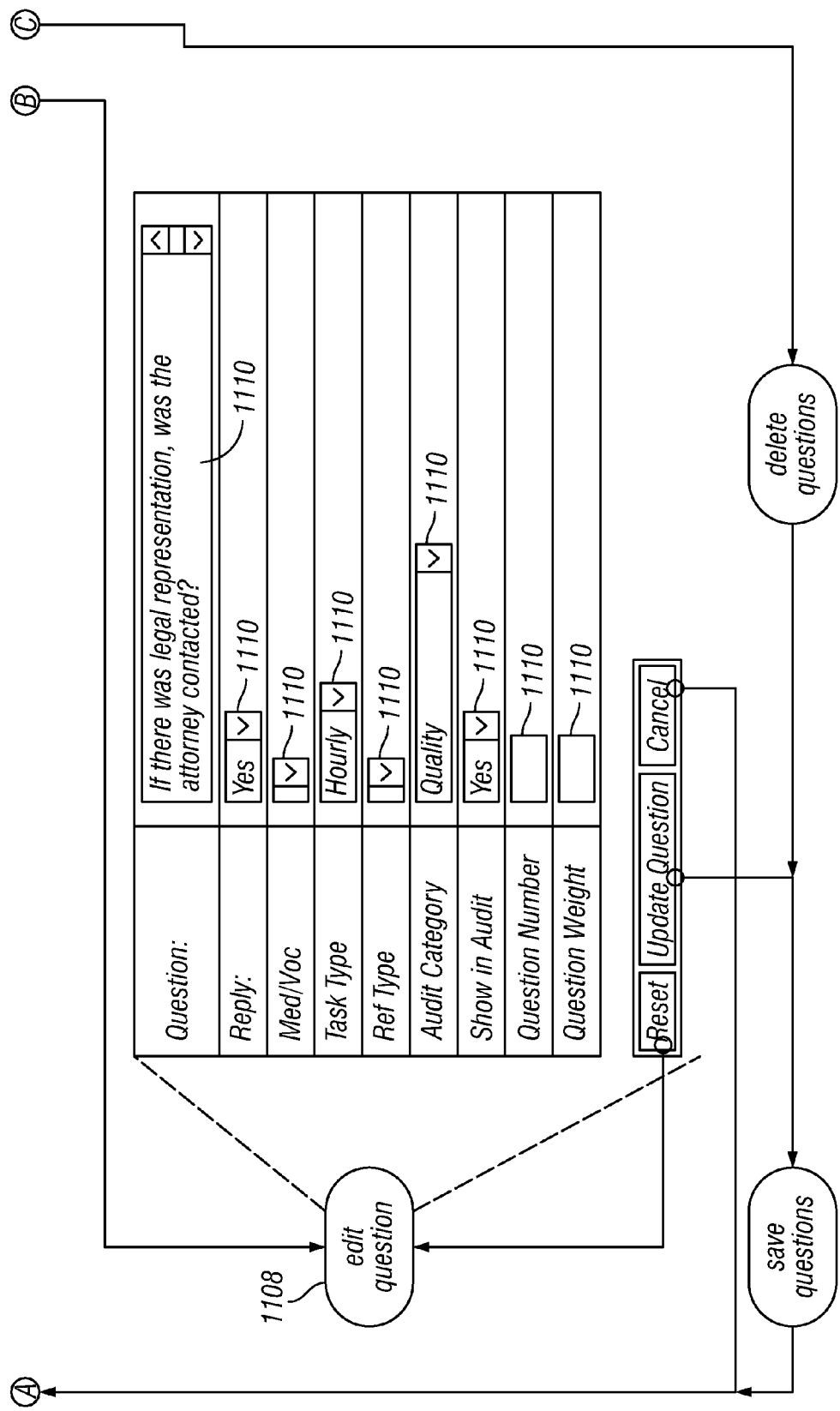

Referring to FIG. 11, when activated at a step 1102, the audit revision module 1100 modifies the managerial interface 302 to display a set of audit questions 618 corresponding to a referral type associated with the link by which the audit revision module has been accessed. At step 1102 the audit revision module 1100 also displays, along with each audit question 618, an edit link 1104 and a delete link 1106. Clicking on any of the edit links 1104 causes the managerial interface 302 at a step 1108 to provide data fields 1110 for modifying the question 618. At step 1108 the audit revision module 1100 also provides controls for resetting the data fields 1110, updating the question 618 based on the data fields 1108, and adding a new question.

Figure 12:
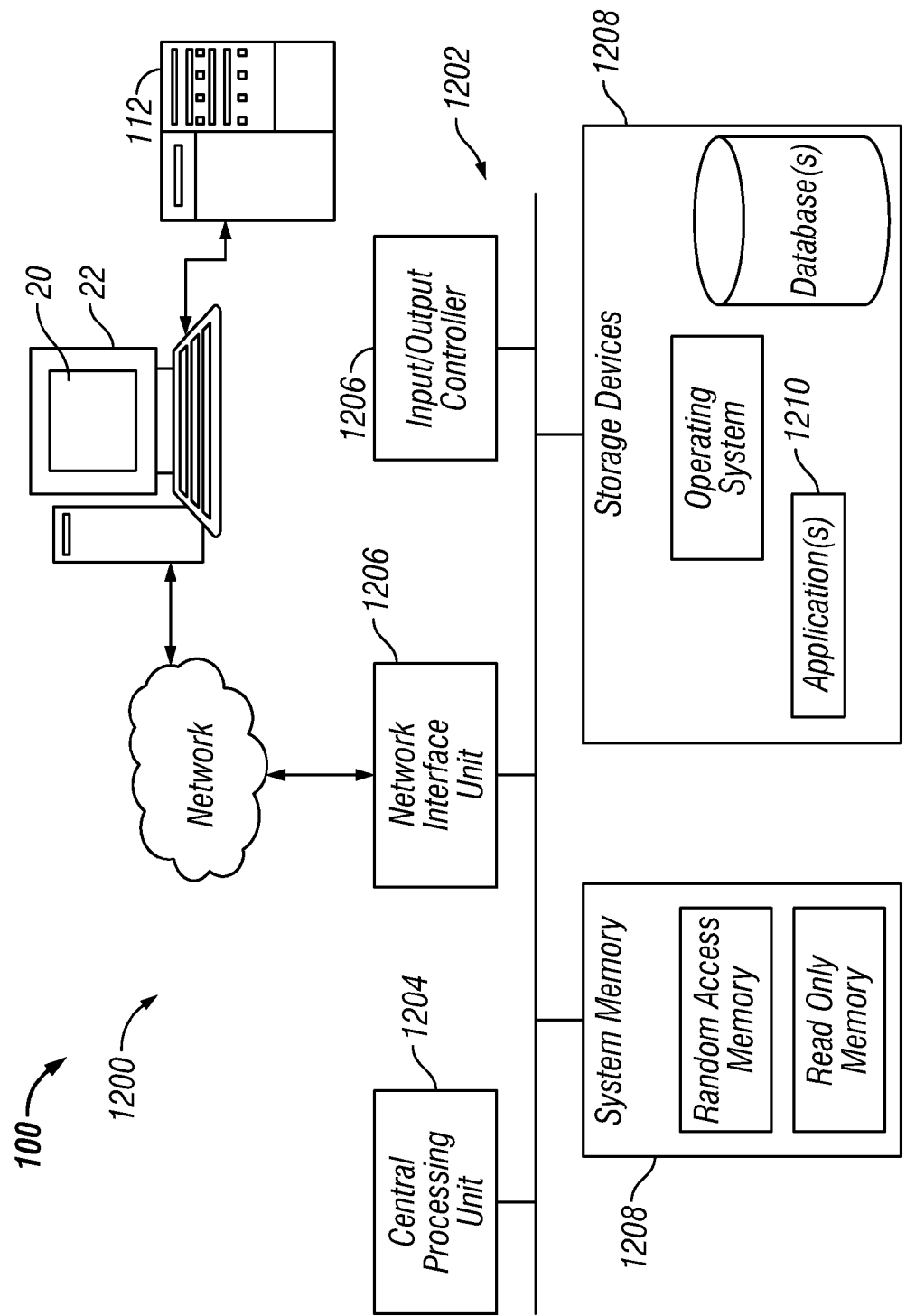
FIG. 12 shows a central server architecture implementation of the computerized system and method shown in FIGS. 1-9.
Figure 13:
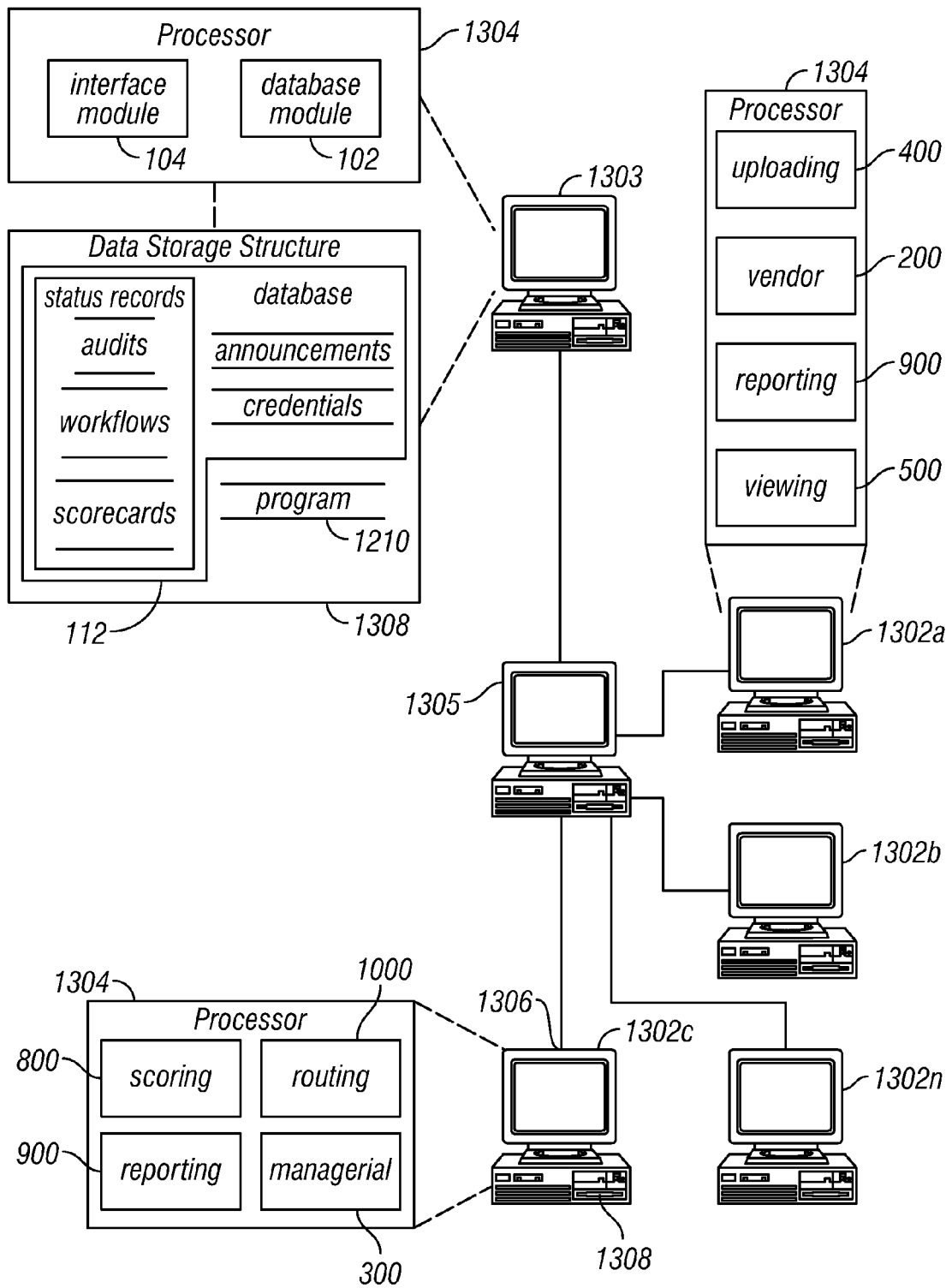
FIG. 13 shows a distributed network architecture implementation of the computerized system and method shown in FIGS. 1-9.

Referring to FIGS. 12 and 13, the computerized system 100 may be implemented in many different ways. For example, the computerized system 100 may be implemented in a central server architecture 1200 that is centered on a conventional network host computer 1202, as shown in FIG. 12. Alternatively, and preferably, the computerized system 100 can be implemented in distributed network architecture 1300, as shown in FIG. 13.

Referring to FIG. 12, the network host computer 1202 includes at least one controller, processor, or central processing unit (CPU) 1204, at least one communication port 1206, and one or more data storage structures 1208. The processor 1204 may include one or more conventional microprocessors and one or more supplementary co-processors such as math co-processors. The communication port 1206 may include multiple communication channels for simultaneous communication with, for example, other processors, servers or client terminals, or a display unit. Devices in communication with each other need not be continually transmitting to each other. On the contrary, such devices need only transmit to each other as necessary, may actually refrain from exchanging data most of the time, and may require several steps to be performed to establish a communication link between the devices.

For example, the communication port 1206 may include wire modems, wireless radio, infrared, visible laser, or UV laser transceivers, or audio transceivers. The communication port 1206 and the one or more data storage structures 1208 are in communication with the processor 1204 to facilitate the operation of the network host computer 1202. The data storage structures may comprise an appropriate combination of magnetic, optical and/or semiconductor or flash memory, and may include, for example, RAM, ROM, an optical disc such as a compact disc and/or a hard disk or drive. The processor and the data storage structures each may be, for example, located entirely within a single computer or other computing device; or connected to each other by a communication medium, such as a USB port, serial port cable, a coaxial cable, an Ethernet type cable, a telephone line, a radio frequency transceiver or other similar wireless or wireline medium.

At least one of the data storage structures 1208 is encoded with (i) a program and/or algorithm(s) (e.g., computer program code and/or a computer program product) 1210 adapted to configure one or more of the processors 1204 to emulate the various modules of the computerized system 100, as described in detail hereinabove; and/or (ii) at least one database configured to store information required, manipulated, or produced by the computerized system 100 in execution of the program, such as, for example, database 112.

The computer program 1210 for configuring the processor 1204 to implement the computerized system 100 (and other functions described herein) can be developed by a person of ordinary skill in the art, and is not described in detail herein. Suitable computer program code may also be provided for performing numerous other functions such as generating notifications at selected time intervals. For example, in addition to instructions for configuring the processor to implement the computerized system 100, the program 1210 also may include program elements such as an operating system, a database management system and "device drivers" that allow the processor to interface with computer peripheral devices (e.g., a video display, a keyboard, a computer mouse). The processor 1204 may read the instructions of the program 1210 from the data storage structures 1208. The program 1210 may be stored, for example, in a compressed, an uncompiled and/or an encrypted format, and may include computer program code. While execution of sequences of instructions in the program 1210 will configure the processor 1204 to emulate one or more of the modules of the computerized system 100, hard-wired circuitry may be used in place of, or in combination with, software instructions for implementation of the computerized system 100. Thus, embodiments of the present invention are not limited to any specific combination of hardware and software.

Each user device or computer or client terminal may include any one or a combination of a keyboard, a computer display, a touch screen, LCD, voice recognition software, an optical or magnetic read head, or other input/output devices required to implement the above functionality. Each display unit may include any one or a combination of a computer display, a printer, a CD/DVD burner, a magnetic tape drive, a magnetic disk drive, an LCD array, a voice speaker, a network connection, or similar output device. At least one of the user devices or computers or client terminals, or of the display units, may be configured according to the computer program, or according to other instructions, to provide various user interfaces for receiving data and for displaying messages including display of the GUI 118.

Referring to FIG. 13, wherein, similar numbers indicate components similar to those shown in FIG. 12, the distributed network architecture includes several module servers 1302a-n and at least one data server 1303 connected by a communications hub 1305. Each of the module servers 1302a-n includes at least one associated processor 1304, at least one communication port 1306, and one or more data storage structures 1308. The data server 1303 is configured to maintain the database 112 in response to instructions and queries received from the various module servers 1302a-n, according to the program 1210. The communications hub 1305 serves as a primary communication link between the module servers 1302, the data server 1303, and other servers, client or user terminals and related devices including one or more display units. The communications hub 1305 may have minimal processing capability itself, serving primarily as a communications router, or may also act as another module server. A variety of communications protocols may be part of the system, including but not limited to: Ethernet, SAP, SAS™, ATP, Bluetooth, and TCP/IP.

In the distributed network architecture, as shown in FIG. 13, each of the module servers 1302 is configured by execution of the program 1210 to emulate one or more of the various modules and processes of the computerized system 100. For example, the data server 1303 may be configured by the program to emulate interface module 104, as well as database module 102, while module server 1302a may be configured by the program to emulate vendor module 200, uploading module 400, viewing module 500, and reporting module 900.

In the central server architecture shown in FIG. 12 or in the distributed network architecture shown in FIG. 13, the program 1210 may be embodied in a computer-readable medium, other than any of the data storage structures, that provides or participates in providing instructions to the processor (or any other processor of a computing device described herein) for execution. The computer-readable medium may take many forms, including but not limited to, non-volatile media, volatile media, and transmission media. Non-volatile media include, for example, optical or magnetic disks, such as memory. Volatile media include dynamic random access memory (DRAM), which typically constitutes the main memory. Transmission media include coaxial cables, copper wire and fiber optics, including the wires that comprise a system bus coupled to the processor. Transmission media may carry acoustic or light waves, such as those generated during radio frequency (RF) and infrared (IR) data communications.

Common forms of the computer-readable medium can include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other medium from which a computer can read. Various forms of the computer-readable medium may be involved in configuring the processor (or any other processor of a device described herein) to implement the modules and processes of the computerized system 100. For example, as shown in FIG. 13, the program 1210 may initially be borne on a magnetic disk of a remote computer. The remote computer can load the instructions into its dynamic memory and send the instructions over a telephone line using a first modem. A second modem local to the communications hub can receive the data on the telephone line and can use an infrared transmitter to convert the data to a wireless signal. An infrared detector of the communications hub can receive the data carried in the wireless signal and can transfer the data through the communications hub to one of the module servers or to the data server. In addition, instructions may be received as electrical, electromagnetic, or optical signals, conveyed either on optical or electromagnetic cables or as wireless carrier waves that carry data streams representing various types of information.

In use, a vendor logs into the vendor interface 202 and uploads referrals via the uploading module 400. The uploading module 400 checks format and substance of the referrals information, to include date parameters, character vs. numeric formats, standard column widths, and mandatory filled cells. The uploading module 400 displays the uploaded referrals to the vendor via the viewing module 500. •The vendor can exit the viewing process by clicking a button to submit the uploaded referrals to the vendor manager for audit. On receipt of an e-mail or announcement generated by the submit button, the vendor manager can generate a random sample of the referrals via the sampling module 600. Up until the vendor manager generates a random sample of the referrals via the sampling module 600, the vendor still may modify any of the uploaded referrals via the viewing module 500.

Typically, the vendor manager runs the sampling module 600 on a quarterly basis. Optionally, the vendor manager can re-run a query or modify sampling to support a business need.

Once the vendor manager clicks a button or link to approve the random sample, an email notification is delivered to the vendor indicating that the sample is available for audit. From this point forward, the vendor can no longer modify previously uploaded referrals.

Based on the random sample of referrals, the vendor answers standard questions for each referral. The standard questions correspond to the type of service that the vendor provides. The vendor can save answers to the questions to the database with a date and time stamp. Once all questions have been answered the vendor can submit the entire audit for scoring and approval.

The computerized system 100 generates a scorecard based on the vendor's answers to the audit questions, and a scorecard review is held between the vendor and the vendor manager. Based on the formal review, the scorecard results may be modified based on agreed changes to the audit answers, the audit questions, or the scoring system.

One advantage of the present invention is that automated e-mail notifications or announcements generated by the computerized system 100 improve timeliness of process and results both by vendors and by vendor managers. Thus, the present invention allows for greater accuracy and efficiency in referrals handling and claims auditing. Additionally, by enhancing the ease of vendor audits, the present invention improves consumer safety. By enhancing the speed of vendor and referrals information collection, the present invention provides timely trends and forecasts for vendor performance. Additionally, the centralized database 112 enables meta-analysis of referrals and outcomes to assess correlation of outcomes to vendor practices. By expediting vendor-to-vendor manager communications, the computerized system 100 enhances process feedback loops and consistency of vendor compliance with vendor manager guidelines. Additionally, the automated nature of vendor self-audits using the computerized system 100 enhances monitoring, training requirements, and communications. Moreover, speeding up the auditing module 700 reduces case cost endpoints.

For vendors, the computerized system 100 provides quick self-assessment and feedback regarding the vendors' compliance with treatment guidelines, treatment network restrictions, outcome guidelines, and utilization duration guidelines (Return to Work or RTW criteria).

Although this invention has been shown and described with respect to the detailed embodiments thereof, it will be understood by those skilled in the art that various changes in form and detail thereof may be made without departing from the spirit and the scope of the invention.

What is claimed is:

1. A method implemented in one or more computer processors for enabling an insurance company to audit third-party vendors who provide services to an insured in connection with an insurance claim, comprising:

storing by the one or more processors a plurality of vendor referrals associated with a third-party vendor in a database implemented in a data storage device, wherein each of the vendor referrals identifies an insured service that has been provided by the third-party vendor to an insured and billed to the insurance company;

storing by the one or more processors a plurality of audit questions in the database implemented in the data storage device;

selecting by the one or more processors a set of audit questions from the plurality of audit questions stored in the database based on the types of insured services identified in the plurality of vendor referrals associated with the third-party vendor stored in the database; and assessing by the one or more processors the performance of the insured services by the third-party vendor relative to a set of standards predetermined by the insurance company based on answers to the selected set of audit questions.

2. The method as claimed in claim 1, further comprising receiving, at a communications hub, the plurality of vendor referrals.

3. The method as claimed in claim 2, wherein the plurality of vendor referrals associated with the third-party vendor are uploaded by the third-party vendor via the communications hub.

4. The method as claimed in claim 1, further comprising transmitting at least the selected set of audit questions to a client machine associated with the third-party vendor.

5. The method as claimed in claim 4, further comprising receiving answers to the selected set of audit questions at the one or more computer processors.

6. The method as claimed in claim 1, further comprising generating by the one or more computer processors a scorecard based on the answers to the selected set of audit questions, which indicates how the third-party vendor has performed relative to the set of predetermined standards.

7. The method as claimed in claim 6, further comprising transmitting the scorecard by the one or more computer processors to a client machine associated with the third-party vendor.

8. The method as claimed in claim 6, further comprising generating by the one or more computer processors a vendor workflow schedule in the database based on the scorecard.

9. The method as claimed in claim 6, wherein the selected set of audit questions is selected based on a previous scorecard associated with the third-party vendor.

10. The method as claimed in claim 6, further comprising storing by the one or more computer processors the scorecard in the database.

11. The method as claimed in claim 1, further comprising randomly selecting by the one or more computer processors a subset of vendor referrals from the plurality of vendor referrals associated with the third-party vendor stored in the database; and wherein the set of audit questions is selected from the plurality of audit questions stored in the database based on the types of insured services identified in the selected subset of vendor referrals.

12. A system for enabling an insurance company to audit third-party vendors who provide services to an insured in connection with an insurance claim, comprising:

at least one data storage device implementing a database configured to store a plurality of audit questions and a plurality of vendor referrals associated with a third-party vendor;

wherein each of the plurality of vendor referrals associated with the third-party vendor identifies an insured service that has been provided by the third-party vendor to an insured and billed to the insurance company; and at least one computer processor configured to:
select a set of audit questions from the plurality of audit questions stored in the database based on the types of insured services identified in the plurality of vendor referrals associated with the third-party vendor stored in the database; and assess the performance of the insured services by the third-party vendor relative to a set of standards predetermined by the insurance company based on the answers to the selected set of audit questions.

13. The system as claimed in claim 12, wherein the at least one computer processor is further configured to receive the plurality of vendor referrals associated with the third-party vendor, which are uploaded to the system by the third-party vendor.

14. The system as claimed in claim 13, wherein the at least one computer processor is further configured to validate each of the plurality of vendor referrals for sufficient information, and to identify at least those vendor referrals that fail validation.

15. The system as claimed in claim 12, wherein at least some of the plurality of vendor referrals are related to worker compensation claims and include information related to services associated with medical treatment of the insured.

16. The system as claimed in claim 12, wherein the at least one computer processor is further configured to retrieve, edit, and store the plurality of audit questions in the database.

17. The system as claimed in claim 12, wherein the at least one computer processor is further configured to transmit at least the selected set of audit questions to a client machine associated with the third-party vendor.

18. The system as claimed in claim 17, wherein the at least one computer processor is further configured to receive answers to the selected set of audit questions at the one or more computer processors.

19. The system as claimed in claim 12, wherein the at least one computer processor is further configured to generate a scorecard based on the answers to the selected set of audit questions, the scorecard indicating how the third-party vendor has performed relative to set of predetermined standards.

20. The system as claimed in claim 19, wherein the at least one computer processor is further configured to transmit the scorecard to a client machine associated with the third-party vendor.

21. The system as claimed in claim 19, wherein the at least one computer processor is further configured to generate a vendor workflow schedule in the database based on the scorecard.

22. The system as claimed in claim 19, wherein the at least one computer processor is further configured to select the set of audit questions from the database based on a stored scorecard associated with the third-party vendor.

23. The system as claimed in claim 19, wherein the at least one computer processor is further configured to store the scorecard in the database.

24. The system as claimed in claim 23, wherein the at least one computer processor is further configured to assess stored scorecards to determine one or more vendor performance trends.

25. The system as claimed in claim 24, wherein the at least one computer processor is further configured to generate a recurring deficiencies checklist based on the vendor performance trends.

26. The system as claimed in claim 12,
wherein the at least one computer processor is further configured to randomly select a subset of vendor referrals from the plurality of vendor referrals associated with the third-party vendor stored in the database; and
wherein the set of audit questions is selected from the plurality of audit questions stored in the database based on the types of insured services identified in the selected subset of vendor referrals.

* * * * *